(12) United States Patent
Tanigawa

(10) Patent No.: US 10,542,163 B2
(45) Date of Patent: Jan. 21, 2020

(54) IMAGE FORMING DEVICE AND METHOD

(71) Applicant: FUJI XEROX CO., LTD., Tokyo (JP)

(72) Inventor: Tomohiro Tanigawa, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/014,086

(22) Filed: Jun. 21, 2018

(65) Prior Publication Data

US 2019/0124215 A1    Apr. 25, 2019

(30) Foreign Application Priority Data

Oct. 19, 2017   (JP) ................... 2017-202782

(51) Int. Cl.
*H04N 1/00*      (2006.01)
*G03G 15/00*     (2006.01)
*G03G 15/16*     (2006.01)

(52) U.S. Cl.
CPC ......... *H04N 1/00376* (2013.01); *G03G 15/16* (2013.01); *G03G 15/607* (2013.01); *H04N 1/00408* (2013.01); *H04N 1/00639* (2013.01)

(58) Field of Classification Search
CPC .......... H04N 1/00376; H04N 1/00639; H04N 1/00408; G03G 15/607; G03G 15/16
USPC ....................................... 358/1.15
See application file for complete search history.

(56) References Cited

U.S. PATENT DOCUMENTS 5,288,015 A * 2/1994 Sauerwine ............. B42D 5/026
229/300

FOREIGN PATENT DOCUMENTS

| JP | 2012-151586 A | 8/2012 |
| JP | 2015-009971 A | 1/2015 |
| JP | 2016-158113 A | 9/2016 |
| JP | 2017-061385 A | 3/2017 |

* cited by examiner

*Primary Examiner* — Tammy Paige Goddard
*Assistant Examiner* — Darryl V Dottin
(74) *Attorney, Agent, or Firm* — Sughrue Mion, PLLC

(57) ABSTRACT

An image forming device includes: a post processor that performs post processing for folding or forming crease on an adjustment sheet including a reference mark and an adjustment pattern filled in with black, across the adjustment pattern based on a predetermined reference position; an image reader that reads an image of the adjustment sheet under a condition that an orientation of the adjustment sheet is changed according to the post processing type or characteristics of the adjustment sheet which is placed on the platen so that the reference mark is in a predetermined direction; a position identifying unit that identifies a fold line or crease position based on the fold line or crease that appears in the adjustment sheet; and a position adjusting unit that adjusts a fold or crease position of the post processor based on a difference between the fold or crease position and the reference position.

13 Claims, 22 Drawing Sheets

FIG. 6A

```
SELECTION OF ADJUSTMENT ITEM
   PLEASE SELECT ADJUSTMENT ITEM.

[ ALIGNMENT ADJUSTMENT ]
   [ TRANSFER VOLTAGE ADJUSTMENT ]
   [ FINISHER ADJUSTMENT ]
```

FIG. 6B

```
FOLD POSITION ADJUSTMENT (SELECTION OF
FOLD PATTERN OR SELECTION OF CREASE)
   PLEASE SELECT FOLD PATTERN
   TO BE ADJUSTED.
   WHEN CREASE IS TO BE ADJUSTED,
   PLEASE SELECT "CREASE".

[ HALF FOLD ]        [ CREASE ]
   [ INNER TRIPLE FOLD ]
   [ Z FOLD ]
      :
```

FIG. 6C

```
POSITION ADJUSTMENT (SELECTION OF PAPER)

PLEASE SELECT PAPER TO BE ADJUSTED.

[ TRAY 1: PLAIN PAPER ]
   [ TRAY 2: HEAVY PAPER ]
   [ TRAY 3: COATED PAPER ]      ( START TO GENERATE
   [ TRAY 4: THIN PAPER ]          ADJUSTMENT SHEET )
      :
```

|  | CHARACTERISTICS |
| --- | --- |
| LANDSCAPE PLACEMENT | EFFECT OF SPECULAR REFLECTION LIGHT IS HIGH |
| PORTRAIT PLACEMENT | EFFECT OF SPECULAR REFLECTION LIGHT IS LOW |

FIG. 14

| CHARACTERISTICS OF ADJUSTMENT SHEET | STATE OF ADJUSTMENT SHEET WHEN PLACED ON PLATEN | PLACEMENT OF ADJUSTMENT SHEET ON PLATEN |
|---|---|---|
| FOLDED ADJUSTMENT SHEET | TONER IS SEPARATED ON FOLD LINE | AMOUNT OF FLOAT OF FOLD LINE IS LARGE | PORTRAIT PLACEMENT (SCANNING IN DIRECTION ALONG FOLD LINE) |
| ADJUSTMENT SHEET HAVING CREASE FORMED | TONER IS NOT SEPARATED ON CREASE | AMOUNT OF FLOAT OF CREASE IS SMALL | LANDSCAPE PLACEMENT (SCANNING IN DIRECTION CROSSING DIRECTION ALONG CREASE) |

IMAGE FORMING DEVICE AND METHOD

CROSS-REFERENCE TO RELATED APPLICATIONS

This application is based on and claims priority under 35 USC 119 from Japanese Patent Application No. 2017-202782 filed on Oct. 19, 2017.

BACKGROUND

Technical Field

The present invention relates to image forming device and method.

SUMMARY

According to an aspect of the invention, there is provided an image forming device including: a post processor that performs post processing to execute folding or form a crease on an adjustment sheet in which a reference mark and an adjustment pattern filled in with black or a highly concentrated color are formed, across the adjustment pattern based on a predetermined reference position; an image reader that reads an image of the adjustment sheet under a condition that an orientation of the adjustment sheet placed on a platen is changed according to a type of the post processing or paper characteristics of the adjustment sheet, and the adjustment sheet, on which the post processing has been performed, is placed on the platen so that the reference mark is located in a predetermined direction on the platen; a position identifying unit that identifies a position of a fold line or a crease based on the fold line or the crease that appears in the image of the adjustment sheet; and a position adjusting unit that adjusts a fold position or a position of a crease of the post processor based on a difference between a position of the fold line or the crease and the reference position.

BRIEF DESCRIPTION OF THE DRAWINGS

Exemplary embodiments of the present invention will be described in detail based on the following figures, wherein:

FIGS. 6A to 6C are screens illustrating an example of a setting screen for the fold position adjustment processing and the crease position adjustment processing;

FIG. 14 is a table illustrating characteristics of a folded adjustment sheet and an adjustment sheet in which a crease is formed, a state of the adjustment sheet when placed on the platen, and a placement manner of the adjustment sheet on the platen;

DETAILED DESCRIPTION

Hereinafter, an exemplary embodiment of the invention will be described with reference to the drawings.

<Device Configuration>

Figure 1:
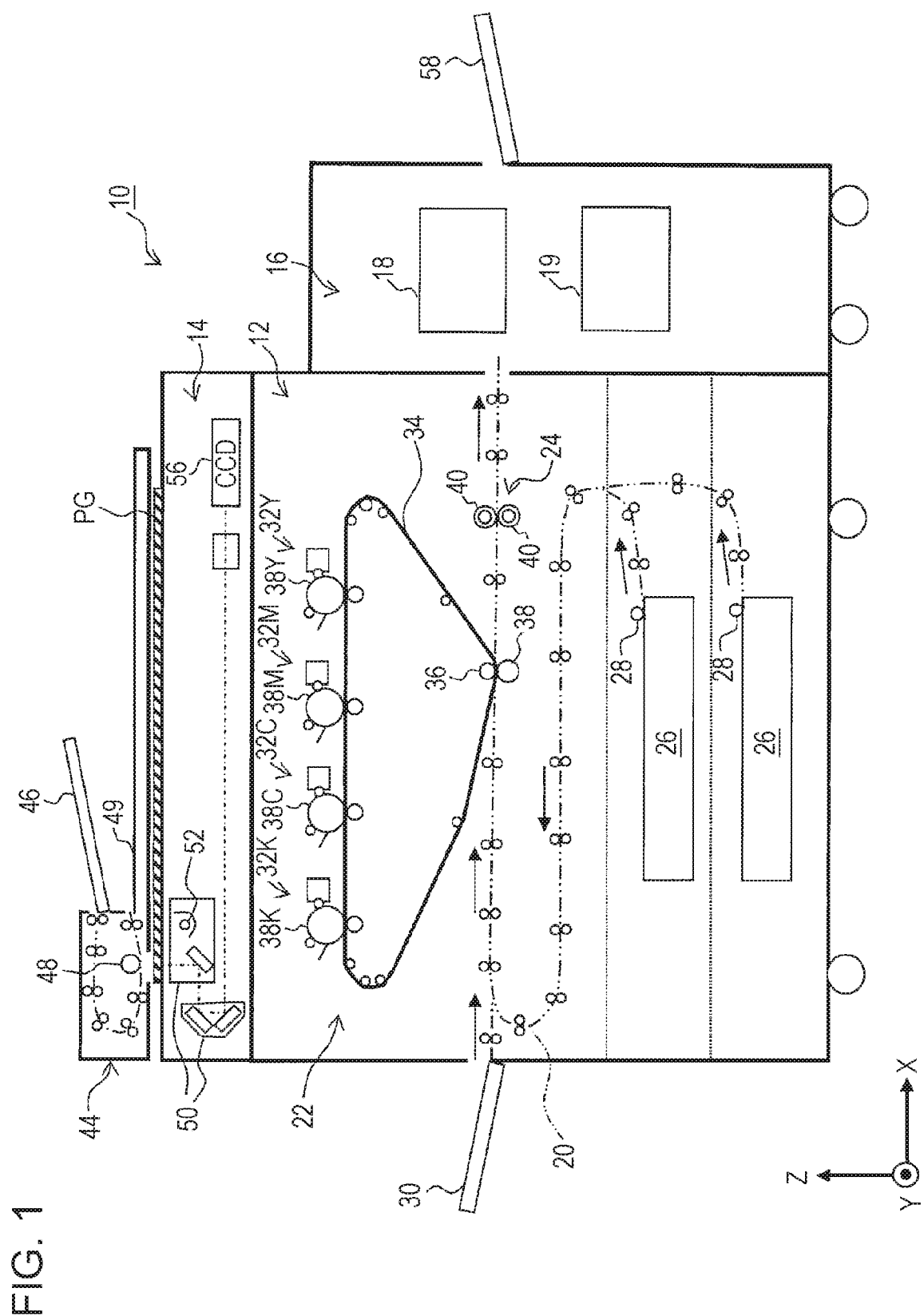
FIG. 1 is a schematic configuration diagram of an image forming device.

FIG. 1 is a schematic configuration diagram of an image forming device in this exemplary embodiment. An image forming device 10 includes an image former 12 that forms an image on recording paper, an image reader 14 which is an image scanner that reads the image of a document, and a post processor 16 which is a finisher that performs fold processing and crease formation processing on the recording paper.

The image forming device 10 in this exemplary embodiment is, for instance, a copy machine that has a copy function of forming an image of a document on the recording paper by the image former 12, the document being read by the image reader 14. Also, the image forming device 10 in this exemplary embodiment is connected to, for instance, a personal computer (hereinafter referred to as a PC) via a network, and performs printing by the image former 12 based on image data inputted as a print job from the PC.

The image forming device 10 receives an instruction for fold processing to be performed on the recording paper from a user interface (hereinafter referred to as a UI) provided in the device body or the PC, and a fold unit 18 of the post processor 16 performs fold processing on the recording paper. The image forming device 10 receives an instruction for crease formation processing to be performed on the recording paper from a UI provided in the device body or the PC, and a crease former 19 of the post processor 16 performs the crease formation processing on the recording paper. As described below, the image forming device 10 adjusts the position of a fold line of the recording paper by the fold unit 18, and adjusts the position of crease of the recording paper formed by the crease former 19.

The image former 12 includes a transport path 20 for transporting the recording paper, a toner image former 22 that forms a toner image on the recording paper, and a fixing unit 24 that fixes a toner image on the recording paper. Also, the image forming device 10 includes multiple sheet trays 26 in which sheets of recording paper are to be stored. Although FIG. 1 illustrates two sheet trays 26, actually more than two sheet trays 26 are provided. In each of the sheet trays 26, sheets of recording paper are stored according to a type (such as the kind, size) of the recording paper, for instance.

The uppermost sheet of recording paper among multiple sheets of recording paper stored in the sheet trays 26 is to be delivered to the transport path 20 by a delivery roller 28. The transport path 20 has one end connected to each sheet tray 26 and the other end connected to a transport path (not illustrated) of the post processor 16 through the toner image former 22. Thus, the recording paper delivered from the sheet trays 26 to the transport path 20 is transported to the toner image former 22, and subsequently, is transported to the post processor 16 through the fixing unit 24.

As illustrated in FIG. 1, the image forming device 10 includes a bypass tray 30. The recording paper placed on the bypass tray 30 is also delivered to the transport path 20, and is transported to the toner image former 22, and subsequently, is transported to the post processor 16 through the fixing unit 24.

The toner image former 22 includes developing units 32Y, 32M, 32C, and 32K having respective colors of yellow (Y), magenta (M), cyan (C), and black (K), and an endless transfer belt 34 as an intermediate retention body. The transfer belt 34 is wound around multiple rollers including the transfer roller 36 near the transport path, and is rotationally driven. Also, the transfer belt 34 is in contact with photoconductor drums 38Y, 38M, 38C, and 38K which are provided in the developing units 32Y, 32M, 32C, and 32K.

The toner image former 22 is to receive input of image signals (raster data) having respective colors of Y, M, C, and K generated based on image data. The toner image former 22 forms toner images in colors of Y, M, C, and K in the respective photoconductor drums 38Y, 38M, 38C, and 38K of the developing units 32Y, 32M, 32C, and 32K based on the image signals, and the toner images are superimposed on the transfer belt 34 and transferred.

In the toner image former 22, a roller 38 (bias transfer roller) is provided to be opposed to the transfer roller 36, and the recording paper is delivered between the transfer roller 36 and the roller 38, and is sandwiched between the transfer roller 36 and the roller 38 along with the transfer belt 34. Consequently, the recording paper is delivered while toner images of the transfer belt 34 are being transferred to the recording paper.

The fixing unit 24 includes a pair of fixing rollers 40, and the recording paper on which toner images have been transferred is delivered between the fixing rollers 40. The fixing unit 24 sandwiches the recording paper, which is delivered between the fixing rollers 40, between the fixing rollers 40, heats the recording paper while pressurizing the recording paper, and fixes the toner images to and delivers the recording paper. Consequently, an image according to the image data is formed on the recording paper.

A general configuration using an electrophotographic system may be applied to the image former 12 described above, and a detailed description is omitted.

The image forming device 10 includes an automatic document transporter 44. The automatic document transporter 44 is supported on a platen glass PG (hereinafter simply referred to as a platen PG) which is a document base. It is to be noted that the platen PG constitutes part of the image reader 14 (image scanner). The automatic document transporter 44 has a document sheet supply tray 46 in which multiple documents having an image to be read are placed in the stack. Each of multiple documents placed in the document paper supply tray 46 is sequentially passed through a copy position on the platen PG, in other words, a pressure-contact position of a platen roller 48 of the document transporter 44, and is discharged to a document paper output tray 49. The automatic document transporter 44 is rotatable with respect to the platen PG upper surface around a rotation shaft (not illustrated) provided at the rear end, which extends in a crosswise direction (the X-axis direction of FIG. 1). When a user or the like places a document on the platen PG by a hand, the automatic document transporter 44 is rotated upward.

The image reader 14 (image scanner) includes the platen PG, and an exposure optical system 50 that is disposed below the platen PG and reads a document image. The exposure optical system 50 includes a light source 52 and multiple mirrors. A document transported to the platen PG upper surface and passed through a copy position by the automatic document transporter 44 or a document manually placed on the platen PG is irradiated with light from the light source 52, and a reflection light from the document is passed through the exposure optical system 50 and converted to an electrical signal by a solid-state imaging charge coupled device (CCD) 56. It is to be noted that when an image of a manually placed document on the platen PG is read, the exposure optical system 50 moves in the X-axis direction of FIG. 1, and scans the document. It is to be noted that the exposure optical system 50 corresponds to a scanner.

A general configuration of, for instance, a CCD image scanner may be applied to the image reader 14 described above, and a detailed description is omitted.

The finisher, which is the post processor 16, includes the fold unit 18 that performs fold processing on the recording paper transported from the image former 12, a crease former 19 that performs crease formation processing on the recording paper, and a discharge tray 58. The fold unit 18 folds the recording paper by a set folding pattern such as half fold, inner triple fold, Z fold, and discharges the folded recording paper to the discharge tray 58. The crease former 19 forms (provides) a crease in recording paper, and discharges the recording paper to the discharge tray 58. The discharged recording paper is to be folded along the crease by a user or the like. It is to be noted that the post processor 16 may include a booklet creator (not illustrated) that creates a booklet by stacking multiple sheets of recording paper, saddle stitching the stacked sheets of recording paper, and half-folding the sheets of recording paper, and a stapler (not illustrated) that stacks multiple sheets of recording paper, and staples the stacked sheets of recording paper at a predetermined position of the peripheral edge. A publicly known configuration in related art may be applied to the fold unit 18, the crease former 19, the booklet creator, and the stapler. It is to be noted that in the present description, the fold processing and the crease formation processing to be performed on the recording paper are defined as the post processing.

Figure 2A:
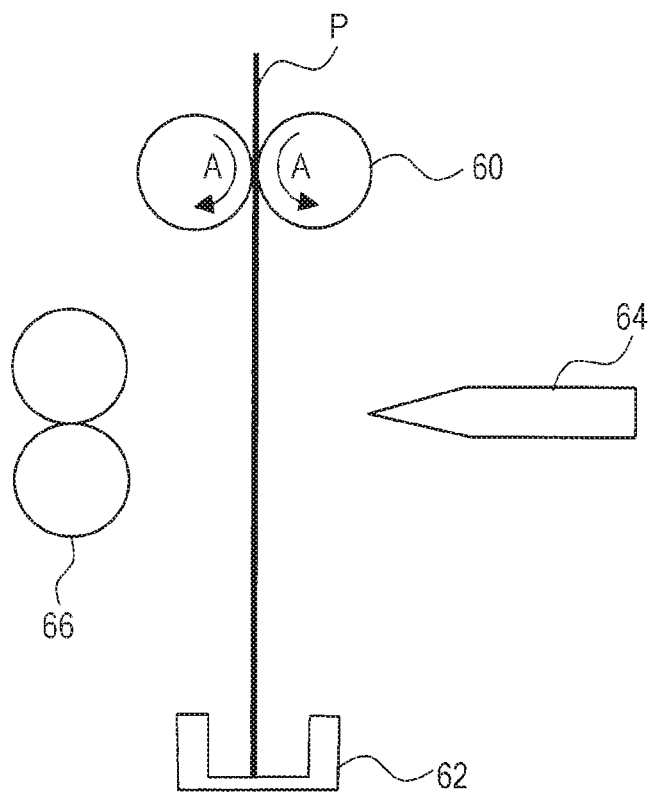
FIGS. 2A and 2B are schematic views of an example of the mechanism of a fold unit.
Figure 2B:
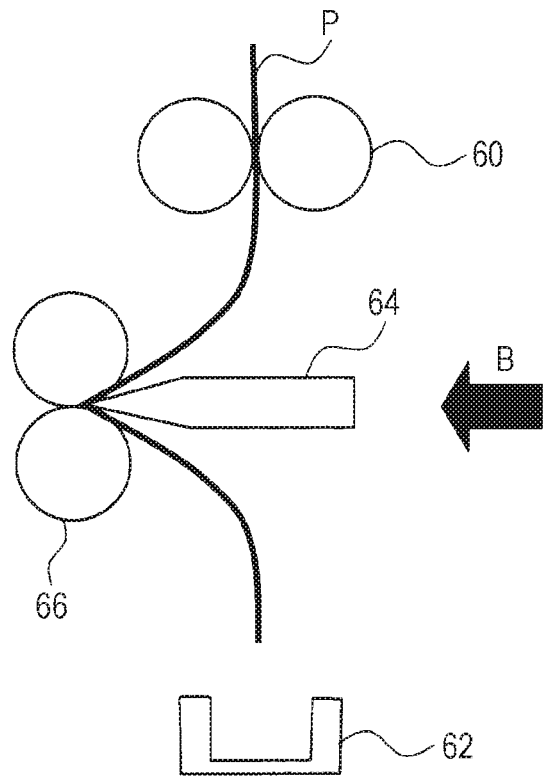

FIGS. 2A and 2B are schematic views of an example of the mechanism of the fold unit 18.

As illustrated in FIG. 2A, recording paper P is transported by a pair of transport rollers 60 which are rotated in the direction of an arrow A, and is bumped against a gate 62. When the recording paper P is bumped against the gate 62, transportation is stopped. When the transportation is stopped, as illustrated in FIG. 2B, a knife-shaped folding member 64 moves to a pair of folding rollers 66 in the direction of an arrow B, and pushes the recording paper P into the pair of folding rollers 66. Consequently, the recording paper P is folded by the pair of folding rollers 66.

The fold position of the recording paper P depends on, for instance, the amount of deflection of the recording paper P pushed out from the pair of transport rollers 60. The recording paper P may be deflected depending on paper characteristics (such as the degree of elasticity, and the thickness of recording paper P), and the amount of deflection may vary. Thus, the fold position has to be adjusted according to the paper characteristics of the recording paper P. It is to be noted that the fold position of the recording paper P may vary due to a factor other than the "amount of deflection" mentioned above.

Figure 3A:
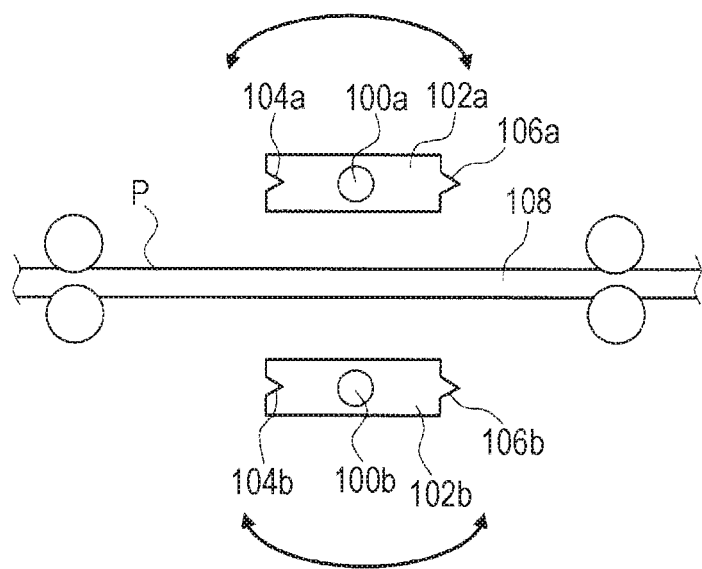
FIGS. 3A to 3C are schematic views of an example of the mechanism of a crease former.
Figure 3B:
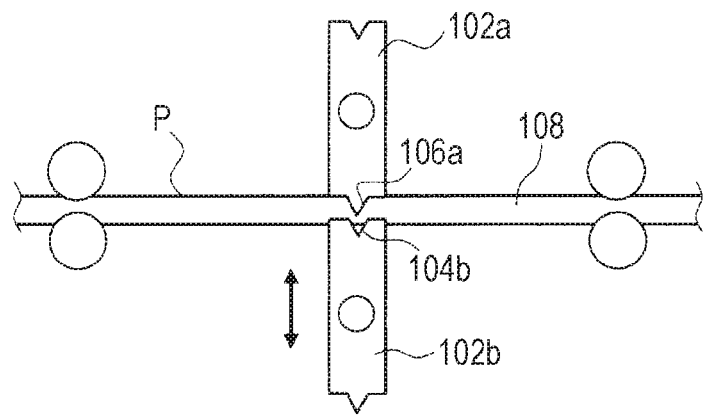
Figure 3C:
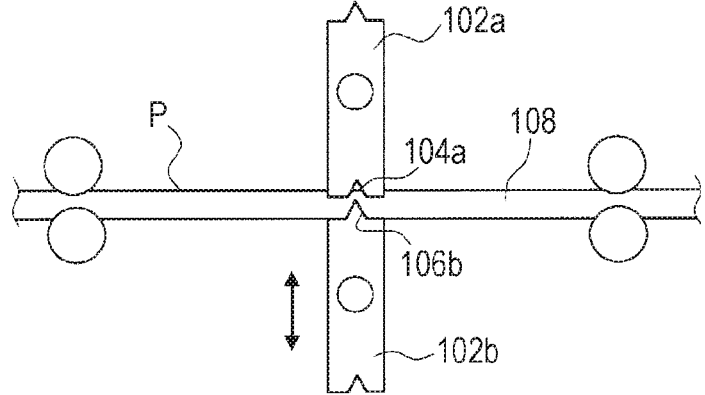

FIGS. 3A to 3C are schematic views of an example of the mechanism of the crease former 19. In FIGS. 3A to 3C, the recording paper P is illustrated with an exaggerated thickness.

As illustrated in FIG. 3A, the crease former 19 includes an upper block 102a rotatably supported by a shaft 100a, and a lower block 102b rotatably supported by a shaft 100b. A triangular groove 104a is formed on a face of the upper block 102a, and a triangular projection 106a is formed on the face opposite to the triangular groove 104a. Also, a triangular groove 104b is formed on a face of the lower block 102b, and a triangular projection 106b is formed on the face opposite to the triangular groove 104b.

When a crease is formed in the recording paper P transported, as illustrated in FIG. 3B, the triangular projection 106a of the upper block 102a and the triangular groove 104b of the lower block 102b are rotated and fixed (first fixed position) to positions opposed to each other across a transport path 108, the lower block 102b is moved to the upper block 102a, the triangular projection 106a and the triangular groove 104b are fitted to each other, the lower block 102b is brought into pressure contact with the upper block 102a, and a crease is formed in the transported recording paper P.

Also, as illustrated in FIG. 3C, the triangular groove 104a of the upper block 102a and the triangular projection 106b of the lower block 102b are rotated and fixed (second fixed position) to positions opposed to each other across a transport path 108, the lower block 102b is moved to the upper block 102a, the triangular groove 104a and the triangular projection 106b are fitted to each other, the lower block 102b is brought into pressure contact with the upper block 102a, and a crease is formed in the transported recording paper P. Thus, a crease in an inverted orientation of the above-mentioned crease is formed in the recording paper P.

The crease position of the recording paper P may be displaced from a position specified by a user, and the crease position has to be adjusted.

<Control Configuration>

Figure 4:
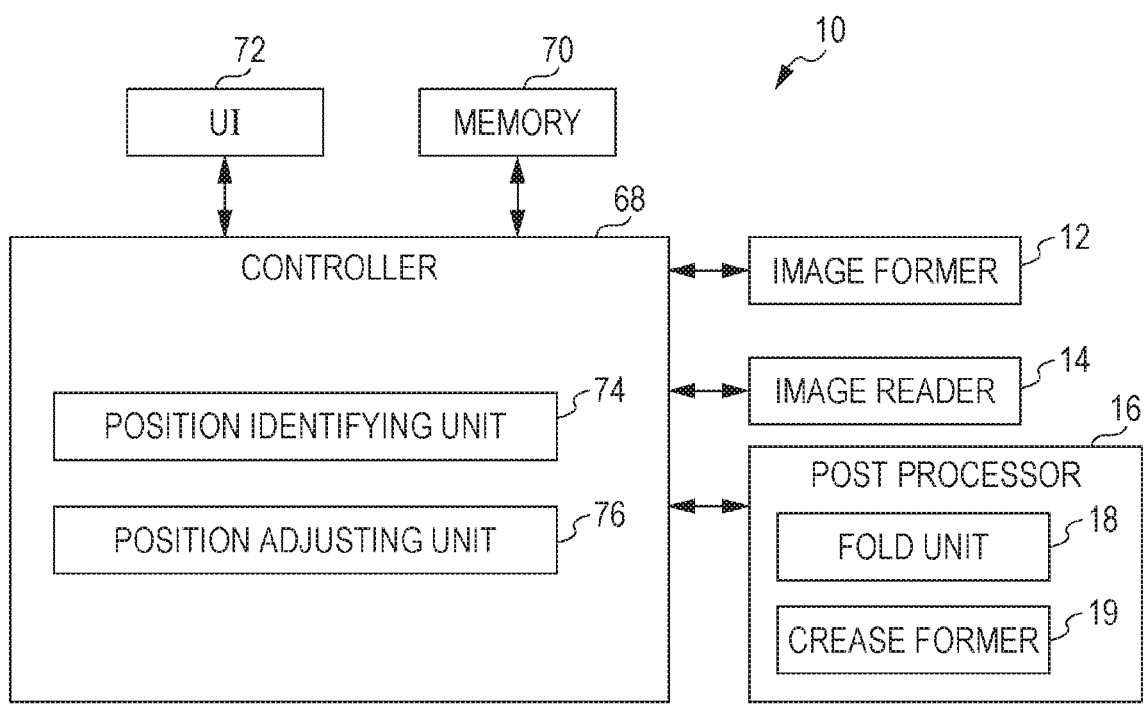
FIG. 4 is a diagram illustrating a control configuration of fold position adjustment processing and crease position adjustment processing of the image forming device.

FIG. 4 is a block diagram illustrating the control configuration of fold position adjustment processing and crease position adjustment processing of the image forming device 10 in this exemplary embodiment. The image forming device 10 includes a controller 68, a memory 70, and a user interface (UI) 72. The controller 68 includes a processor such as a CPU, and executes processing in accordance with a program stored in the memory 70. Thus, the controller 68 functions as the later-described position identifying unit 74, and position adjusting unit 76. The memory 70 is a ROM, a RAM, or a flash memory or the like, and stores a program executed by the controller 68, an adjustment value determined by the fold position adjustment processing, an adjustment value determined by the crease position adjustment processing, and temporary data. The UI 72 displays a setting screen in the fold position adjustment processing and the crease position adjustment processing, and receives an operation from a user or a serviceman or the like (hereinafter referred to as a user). It is to be noted that the UI 72 corresponds to a display. The controller 68 is connected to the image former 12, the image reader 14, and the post processor 16 (including the fold unit 18 and the crease former 19), and can control each of these components.

<Fold Position Adjustment Processing>

Figure 5:
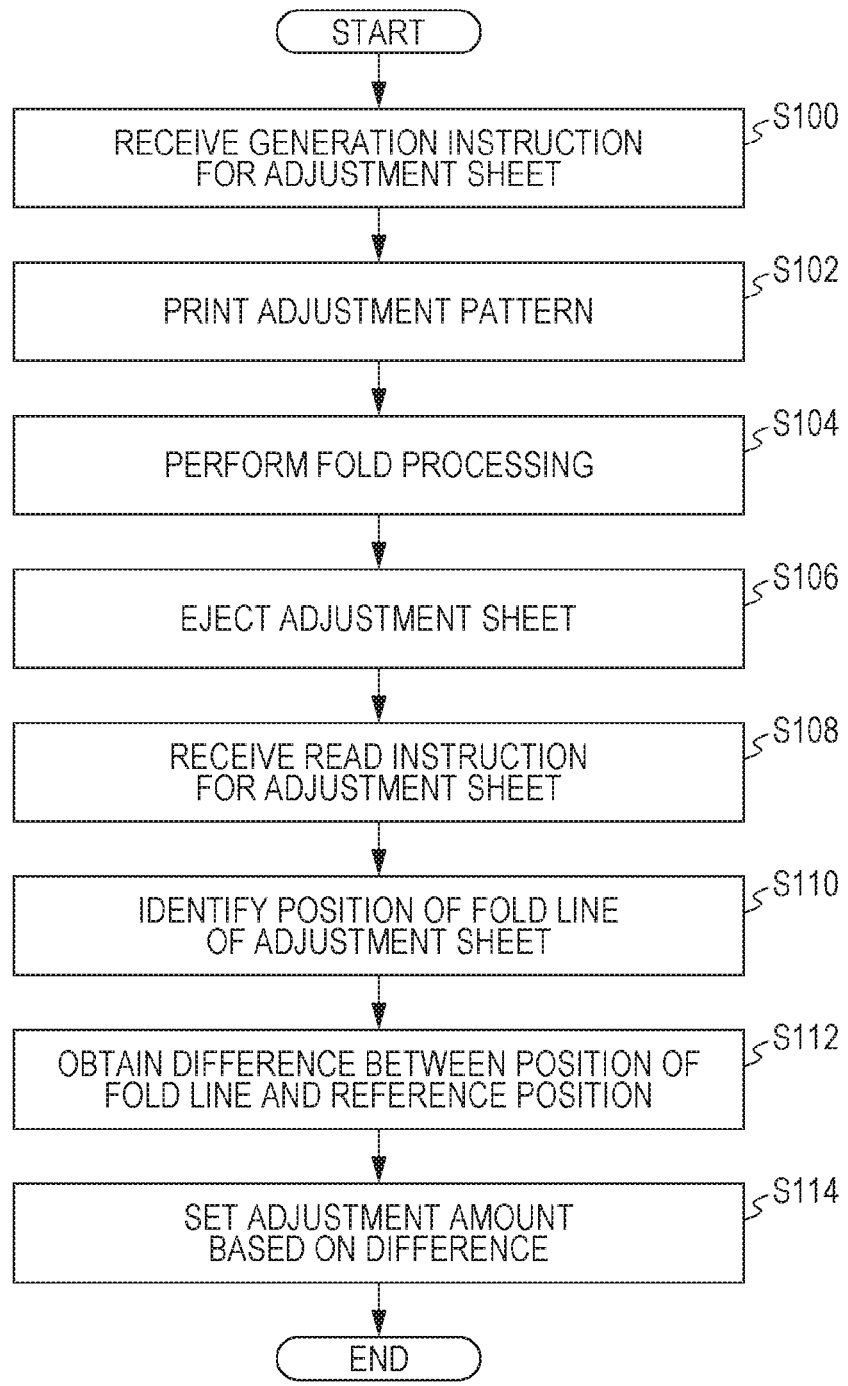
FIG. 5 is a flowchart illustrating the flow of the fold position adjustment processing of the image forming device.

Next, the fold position adjustment processing will be described. FIG. 5 is a flowchart illustrating the flow of the fold position adjustment processing of the image forming device 10. In this exemplary embodiment, the fold position adjustment processing is performed by executing the flow of FIG. 5 for each of the types of recording paper and for each of the fold patterns of recording paper.

First, in S100, the controller 68 receives a generation instruction for an adjustment sheet via the UI 72. FIGS. 6A to 6C are screens illustrating an example of a setting screen of the fold position adjustment processing and an adjustment sheet generation instruction receiving screen displayed on the UI 72. First, a selection screen for adjustment item illustrated in FIG. 6A is displayed, and "finisher adjustment" is selected by a user, for instance. Next, a selection screen for fold pattern illustrated in FIG. 6B is displayed, and a fold pattern to be adjusted is selected by a user. Next, a selection screen for recording paper (paper) illustrated in FIG. 6C is displayed, and recording paper to be adjusted is selected by a user. Although only the types of paper are illustrated and paper sizes are not illustrated in FIG. 6C, a paper size (for instance, A3, A4, or B5) may be selected in addition to a type of paper.

When the "START TO GENERATE ADJUSTMENT SHEET" button illustrated in FIG. 6C is touched, a generation instruction for an adjustment sheet is received. When a generation instruction for an adjustment sheet is received, the controller 68 controls the image former 12, supplies the recording paper from the paper tray 26 which stores the recording paper (paper) selected in FIG. 6C, and delivers the recording paper to the transport path 20. It is also possible for a user to place the recording paper selected in FIG. 6C in the bypass tray 30, and to supply the recording paper from the bypass tray 30 by touching the "START TO GENERATE ADJUSTMENT SHEET" button, and to deliver the recording paper to the transport path 20. The supplied recording paper serves as an adjustment sheet. The adjustment sheet may also be simply referred to as the "sheet".

Figure 7A:
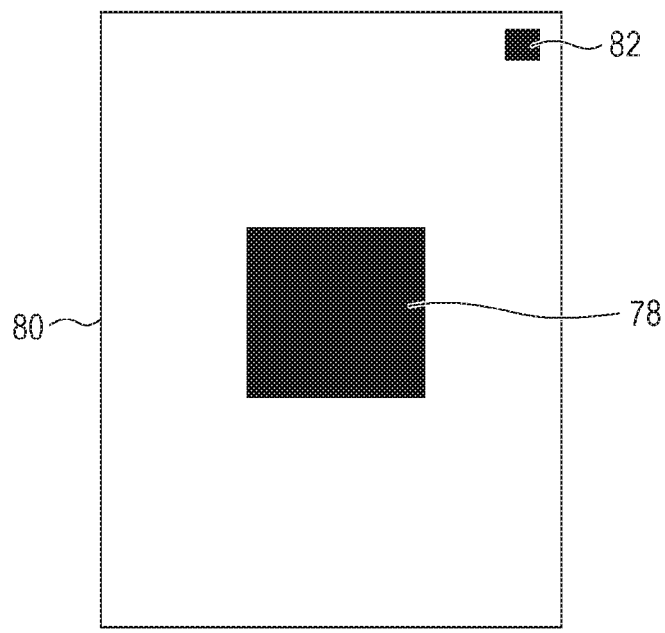
FIG. 7A is a view illustrating an example of an adjustment sheet on which an adjustment pattern in the fold position adjustment processing is printed.

Next, in S102 of FIG. 5, the controller 68 controls the image former 12 so that a predetermined adjustment pattern and a reference mark are printed on the recording paper (adjustment sheet) supplied from the paper tray 26 or the bypass tray 30. FIG. 7A is a view illustrating an example of an adjustment sheet 80 on which an adjustment pattern 78 and a reference mark 82 are printed. The adjustment pattern 78a in this exemplary embodiment is a pattern (patch) that is filled in with black or a highly concentrated color, and is printed (formed) in an area in which the adjustment sheet 80 is folded by the fold unit 18 of the post processor 16. As described later, the reference mark 82 indicates the orientation of the adjustment sheet when placed on the platen PG of the image reader 14.

Although the adjustment pattern 78 is printed near the center of the adjustment sheet 80 in FIG. 7A, the adjustment pattern 78 may be printed near the left side edge or the right side edge, or from the left side edge to the lower side edge. Also, the lengthwise width of the adjustment pattern 78 is not limited to what is illustrated in FIG. 7A, and may be narrower or wider than what is illustrated in FIG. 7A.

The adjustment pattern 78 is printed with only the toner of K color, for instance. Alternatively, the adjustment pattern 78 is printed in black by mixing each toner of C color, M color, and Y color, for instance. Also, the adjustment pattern 78 may have a gray color having a predetermined concentration, or a color other than black, having a predetermined concentration. The color, size of the adjustment pattern 78, and the position of the adjustment sheet 80 are pre-stored in the memory 70, for instance. It is to be noted that the pattern which is the adjustment pattern and filled in with black or a highly concentrated color may have a uniform concentration in the pattern to some extent. The concentration is not necessarily uniform in a strict sense, and includes varying concentration which may occur depending on design or operation, for instance. Also, the highly concentrated color is high enough to allow the position (color having a low concentration) of a fold line to be detected. The concentration which appears as the position of a fold line may be the one which facilitates comparison with a low color.

Figure 7B:
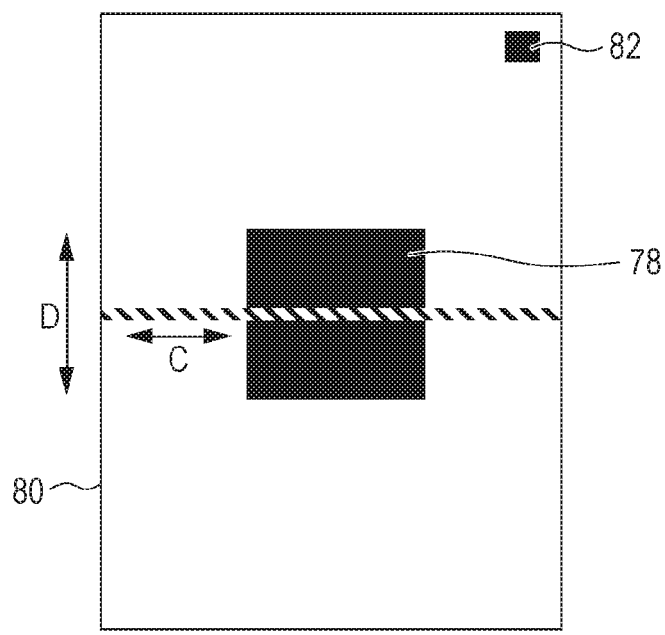
FIG. 7B is a view illustrating an example of a state of the adjustment sheet on which fold processing is performed.

As illustrated in FIGS. 7A and 7B, in the adjustment sheet 80 in this exemplary embodiment, the reference mark 82 is printed (formed) in an area in the upper right corner of the adjustment sheet 80. The reference mark 82 is a square filled in with black. However, the shape, color, size, position or the like of the reference mark 82 are not limited to what is illustrated in FIGS. 7A and 7B. The shape, color, size, position or the like of the reference mark 82 are pre-stored in the memory 70, for instance.

In S102 of FIG. 5, after an adjustment pattern is printed on the adjustment sheet, the adjustment sheet is delivered to the post processor 16. In S104, the controller 68 controls the post processor 16 (the fold unit 18) so that fold processing is performed on the adjustment sheet. The fold processing is performed using a fold pattern selected in FIG. 6B. FIG. 7B is a view illustrating an example of the adjustment sheet 80 on which the half fold processing is performed after "HALF FOLD" is selected in FIG. 6B. The fold position is illustrated by oblique lines in FIG. 7B. The fold position of the adjustment sheet 80 is pre-stored as a reference position in the memory 70, for instance. In other words, the reference position is a predetermined fold position. Although the fold unit 18 performs fold processing on the adjustment sheet 80 in accordance with a reference position, an actual fold position may deviate from the reference position. Here, the fold unit 18 performs fold processing across the adjustment pattern 78.

Figure 8:
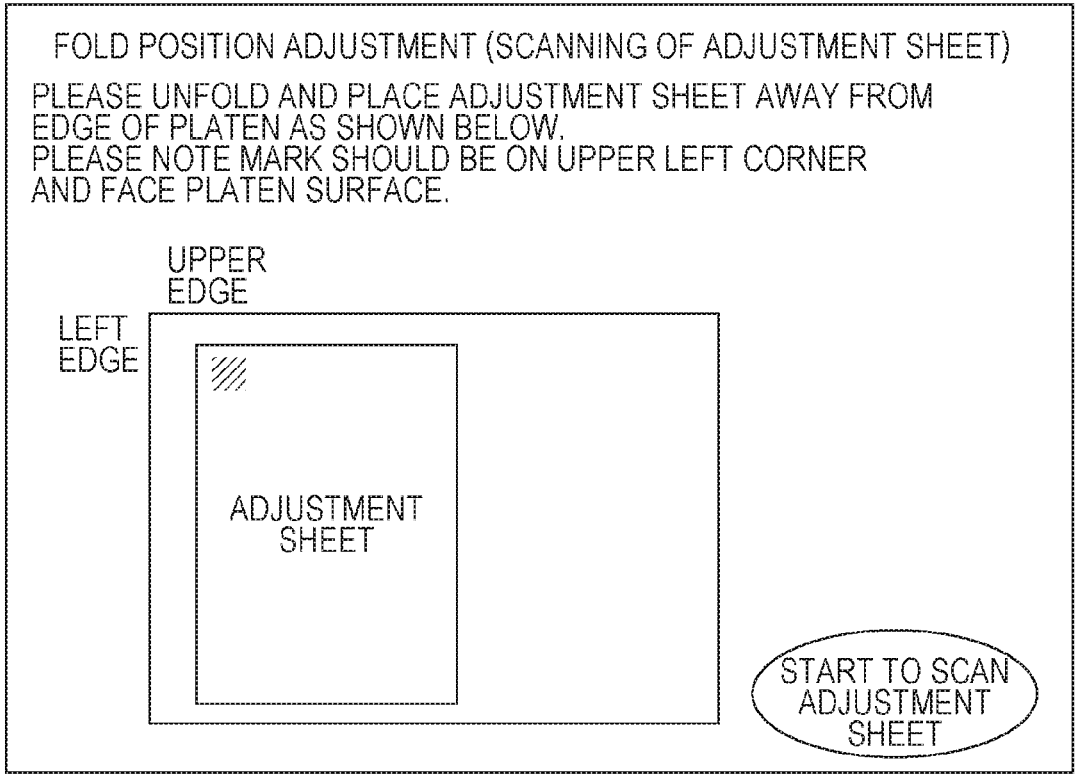
FIG. 8 is a screen illustrating an example of a guide screen when an adjustment sheet in the fold position adjustment processing is placed on a platen.

Next, in S106 of FIG. 5, the controller 68 discharges the adjustment sheet folded by the fold unit 18 to the discharge tray 58. A user then unfolds the adjustment sheet (folded adjustment sheet) discharged to the discharge tray 58, and places the unfolded adjustment sheet on the platen PG. FIG. 8 is an example of a guide screen (first screen) for placing an adjustment sheet displayed on the UI 72 on the platen PG. As illustrated in FIG. 8, the UI 72 displays guidance indicating that an adjustment sheet should be placed away from the edge of the platen PG. Other guidance is displayed, which indicates that the reference mark (■ mark) should be located at the upper left corner, and the side of the adjustment sheet, on which the reference mark (and the adjustment pattern) are printed, should face the platen PG surface. A user or the like unfolds and places the adjustment sheet on the platen PG in accordance with the guidance. In this manner, the adjustment sheet is placed on the platen PG so that the reference mark is located at the upper left corner which is in a predetermined direction. The display of the guide screen (the first screen) allows a user or the like to accurately recognize the orientation of the adjustment sheet which is placed on the platen PG.

Figure 9:
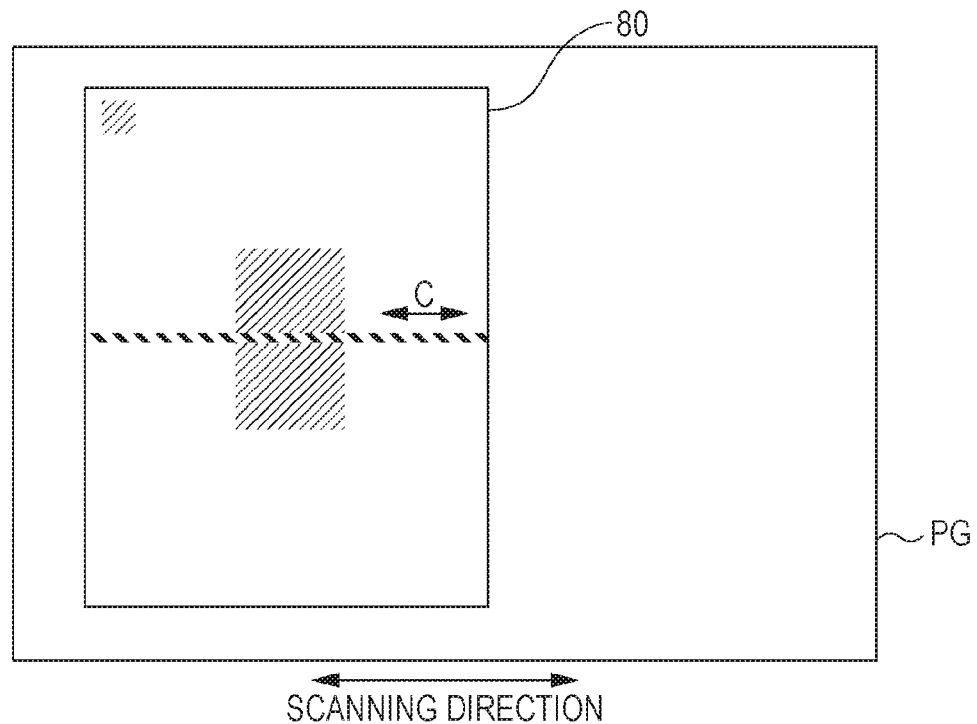
FIG. 9 is a view illustrating a state where an adjustment sheet is placed on the platen in the fold position adjustment processing.

FIG. 9 is a top view of the state of the adjustment sheet 80 which is placed on the platen PG. Since the adjustment sheet 80 is placed such that the side thereof, on which the reference mark and the adjustment pattern are printed, faces the platen PG in FIG. 9, the reference mark and the adjustment pattern are not seen. However, in order to clarify those positions, the positions are illustrated by thin lines. In FIG. 9, the scanning direction of the exposure optical system 50 (the scanner) of the image reader 14 is also illustrated. As illustrated in FIG. 9, the adjustment sheet 80 is placed on the platen PG so that the image of the adjustment sheet 80 is read by scanning the adjustment sheet with the scanner of the image reader 14 in direction C along the fold line (thick oblique lines of FIG. 9). Hereinafter, the above-mentioned placement of the adjustment sheet on the platen PG is referred to as the "portrait placement", and an adjustment sheet in the "portrait placement" is defined as a first adjustment sheet.

Next, in S108 of FIG. 5, the controller 68 receives a read instruction for adjustment sheet via the UI 72. Specifically, when the "START TO SCAN ADJUSTMENT SHEET" button illustrated in FIG. 8 is touched, a read instruction for adjustment sheet is received. The controller 68 controls the image reader 14 so that the image (the image of the first adjustment sheet) of the adjustment sheet is read. Specifically, the exposure optical system 50 of the image reader 14 moves to scan the adjustment sheet, thereby reading the image of the adjustment sheet. In this manner, the image reader 14 reads the image of the adjustment sheet with the adjustment sheet folded by the fold unit 18 unfolded.

Figure 10:
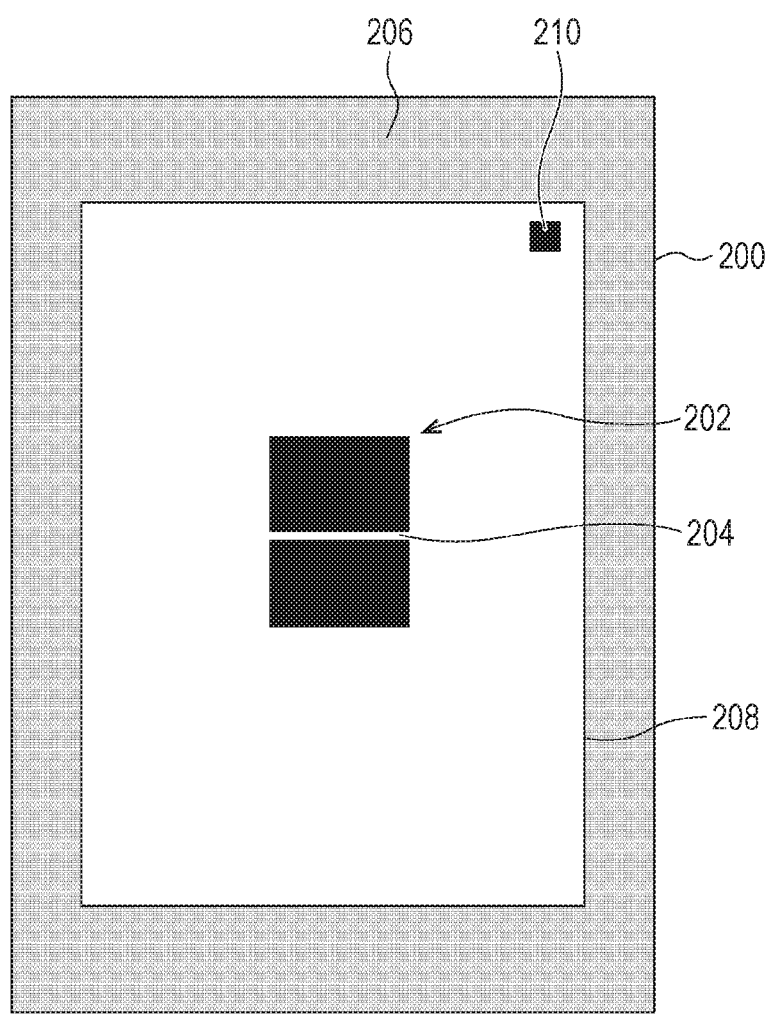
FIG. 10 is a view illustrating an example of an image of an adjustment pattern of an adjustment sheet which is read in the fold position adjustment processing.

FIG. 10 is a view illustrating an example of an image 200 of the read adjustment sheet. When the read image of the adjustment sheet is a color image, the image may be converted from a color image into a monochrome image by a publicly known method in related art. FIG. 10 illustrates an image after the conversion. As illustrated in FIG. 10, the image 200 of the adjustment sheet has an adjustment sheet section 208 (white section of FIG. 10), and an outer-side section 206 (gray section of FIG. 10) of the adjustment sheet section 208. An adjustment pattern section 202, and an image of the reference mark (a reference mark image 210) appear in the adjustment sheet section 208.

In the adjustment pattern section 202, an area including a fold line appears in white color or a color with a low concentration. Hereinafter the area including a fold line is referred to as the white section 204. As factors responsible for appearing of the white section 204, the following two factors may be considered. The first factor is that the toner on the fold line is separated because the adjustment sheet is folded. In other words, the toner on a fold line portion of the adjustment pattern filled in with black or a highly concentrated color is separated, and thus the fold line appears in the adjustment pattern section 202. The second factor is that when the adjustment sheet is placed on the platen glass PG, a fold line portion floats from the platen glass PG, and the angle of reflection light changes at the fold line portion. Thus, the image reader 14 receives specular reflection light which is not supposed to be received by the image reader 14. The controller 68 identifies the position of a fold line in the adjustment sheet by identifying the position of the white section 204.

In this exemplary embodiment, the adjustment sheet has such a feature that when the image of the adjustment sheet is read with the "portrait placement" applied to the adjustment sheet on the platen PG, the white section 204 clearly appears in the adjustment pattern section 202.

Figures 11, 12:
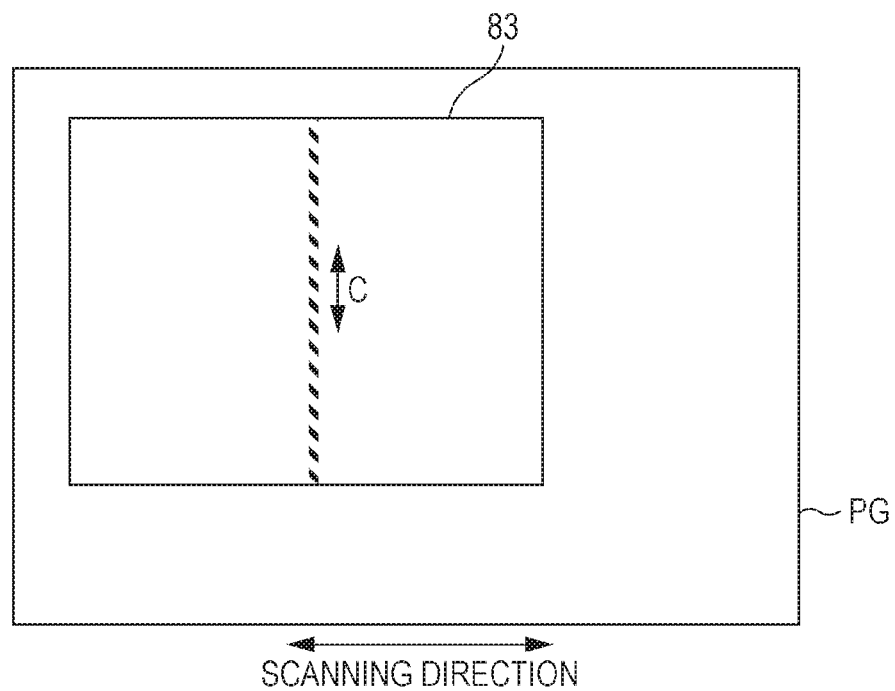
FIG. 11 is a table illustrating the effect of specular reflection light on an image on an adjustment sheet when "landscape placement" or "portrait placement" is applied to the adjustment sheet on the platen.
FIG. 12 is a view illustrating a state where "landscape placement" is applied to the adjustment sheet on the platen.

The possibility of receiving the above-mentioned specular reflection light which is not supposed to be received by the image reader 14 varies with placement manner of the adjustment sheet on the platen PG. As illustrated in FIG. 11, when "landscape placement" is applied to the adjustment sheet on the platen PG, the possibility of receiving the specular reflection light is higher, as compared with the case where "portrait placement" is applied to the adjustment sheet. Here, the "landscape placement" is the placement after the adjustment sheet 80 with portrait placement illustrated in FIG. 9 is rotated 90 degrees, and indicates the placement illustrated in FIG. 12. In other words, as illustrated in FIG. 12, the "landscape placement" is the placement of the adjustment sheet on the platen PG so that the image of the adjustment sheet is read by scanning the adjustment sheet with the scanner of the image reader 14 in a direction (crossing direction) which crosses the direction C along the fold line (oblique lines of FIG. 12) of an adjustment sheet 83.

Figure 13A:
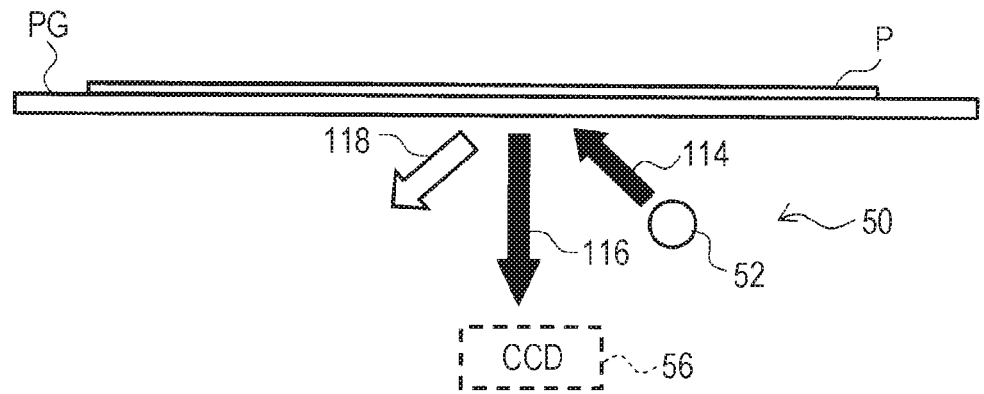
FIGS. 13A and 13B are views for explaining change in the reflection angle of specular reflection light.
Figure 13B:
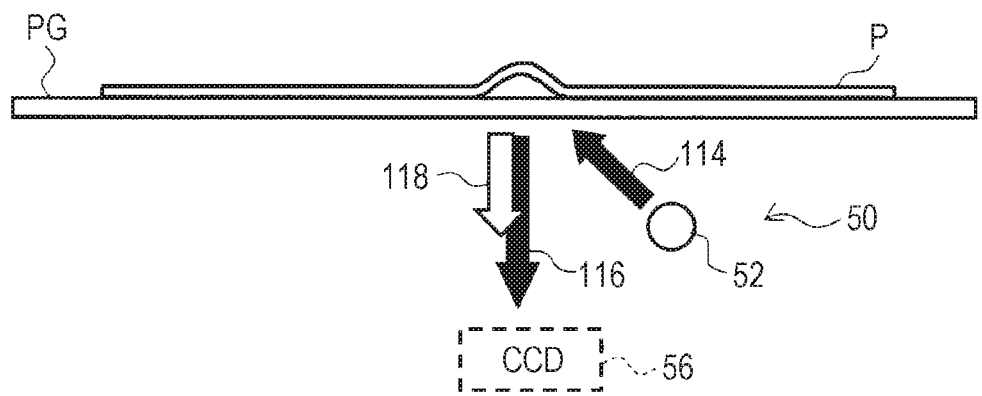

FIGS. 13A and 13B are views for explaining the effect of specular reflection light when the "landscape placement" is applied to the recording paper P such as the adjustment sheet on the platen PG and an image formed (printed) on the recording paper P is read. FIG. 13A illustrates a state where the image on the recording paper P, which has not been folded, is read, whereas FIG. 13B illustrates a state where the image on the recording paper P, which has been folded, is read. In FIGS. 13A and 13B, the exposure optical system 50 (scanner) scans the recording paper P from the left to the right or from the right to the left, and reads the image on the recording paper P. As illustrated in FIG. 13A, when the image on the non-folded recording paper P is read, illumination light 114 emitted from the light source 52 of the exposure optical system 50 reaches the recording paper P, diffuse reflection light 116 from the recording paper P is inputted into the CCD 56 via multiple mirrors (not illustrated), and specular reflection light 118 is not inputted into the CCD 56. In contrast, when the image on the folded recording paper P is read, as illustrated in FIG. 13B, a fold line portion floats from the platen PG, and the angle of the specular reflection light 118 changes at the fold line portion. Thus, the specular reflection light 118 is inputted into the CCD 56.

FIGS. 13A and 13B illustrate the case where "landscape placement" is applied to the recording paper P, whereas when "portrait placement" is applied to the recording paper P, even if a fold line portion of the recording paper P floats from the platen PG, the specular reflection light 118 is not inputted into the CCD 56, or the possibility of input of the specular reflection light 118 into the CCD 56 is low. This is because in the case of "portrait placement", the exposure optical system 50 (scanner) scans the recording paper P in the direction along the fold line (see FIG. 9), and at the fold line floating from the platen PG, the reflection angle of the specular reflection light 118 does not change or hardly changes.

As described above, when the image of the adjustment sheet is read, in order to cause the white section 204 to appear in the adjustment pattern section 202, it may be better for the image reader 14 to receive the specular reflection light. In other words, it may be considered better to read the image of the adjustment sheet with "landscape placement" applied to the adjustment sheet because the white section 204 appears in the adjustment pattern section 202. However, when the folded adjustment sheet is placed on the platen PG with unfolded, the fold line largely floats, and when the image reader 14 receives the specular reflection light on the fold line, the white section 204 appear indistinctly in the image of the adjustment sheet. The white section 204 is in a state where much noise occurs. On the other hand, since the toner on a fold line portion of the folded adjustment sheet is separated, even when the image reader 14 does not receive specular reflection light, the fold line (the white section 204) sufficiently appears in the image of the adjustment sheet. On the contrary, when the image reader 14 does not receive the specular reflection light, the white section 204 more distinctly appears in the image of the adjustment sheet. Thus, in this exemplary embodiment, "portrait placement" is applied to the adjustment sheet in the fold position adjustment on the platen PG. FIG. 14 is a table that summarizes the above-described characteristics of the folded adjustment sheet, the state of the adjustment sheet when placed on the platen PG, and the placement manner of the adjustment sheet on the platen PG. The "ADJUSTMENT SHEET HAVING CREASE FORMED" illustrated in FIG. 14 will be described later.

Figure 15:
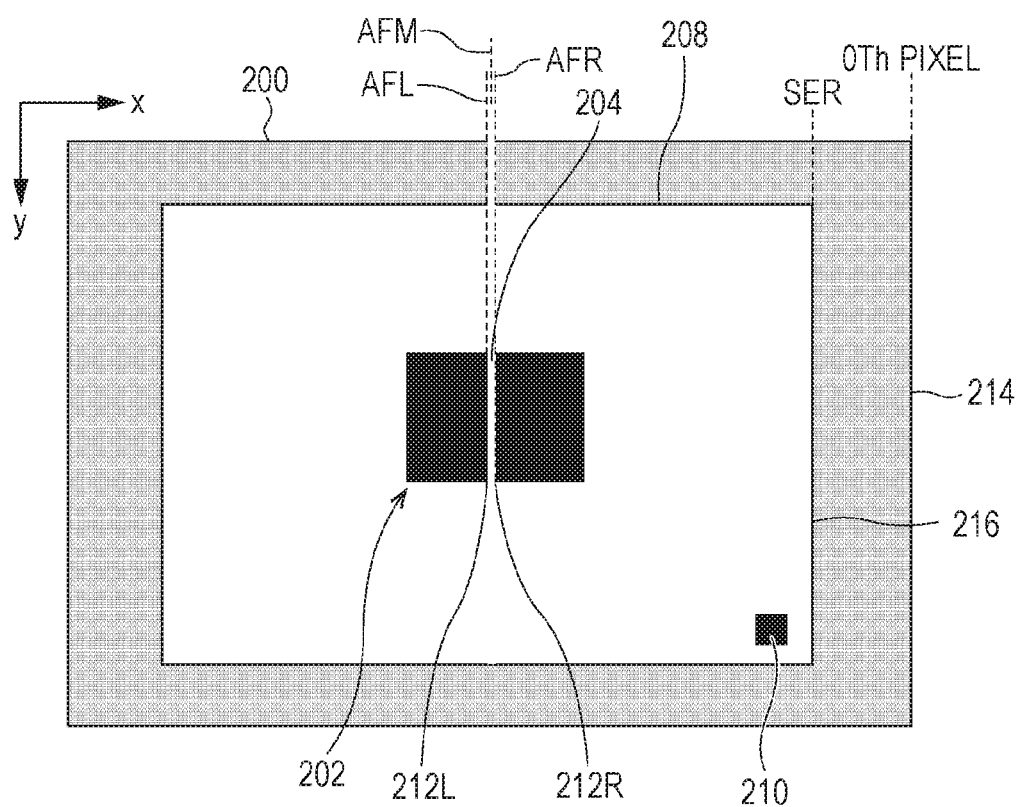
FIG. 15 is a view illustrating an image after the image of the adjustment pattern of FIG. 10 is rotated 90 degrees clockwise.

Returning to FIG. 5, description of the flow of the adjustment processing is continued. In S110 subsequent to S108, the controller 68 functions as the position identifying unit 74, and identifies the position of the fold line based on the fold line which appears in the image of the adjustment sheet. FIG. 15 is a view illustrating the image after the image of the adjustment pattern of FIG. 10 is rotated 90 degrees clockwise. The position identifying unit 74 of the controller 68 identifies the fold line position from the image of the adjustment sheet of FIG. 15, for instance, as described below.

The position identifying unit 74 of the controller 68 identifies a predetermined position of the white section 204 in the X-axis direction (the crosswise direction of FIG. 15) as the position of the fold line. As illustrated in FIG. 15, the adjustment pattern section 202 includes change portions 212L, 212R in which change is made in the X-axis direction from black color (or a highly concentrated color) to the white section 204 which is the area of a fold line. First, the pixel positions of the change portions 212L, 212R in the x-axis direction of FIG. 15 are detected. The pixel positions are detected relative to the edge of the image (the right edge 214 of the image) on the right side as the 0th pixel, the right side including the reference mark image 210. The detection can be made by pattern matching, edge detection or the like in related art, for instance. FIG. 15 illustrates AFL as the pixel position of the change portion 212L, and AFR as the pixel position of the change portion 212R. As illustrated in FIG. 15, a pixel position AFM in the middle (the center) of the pixel position AFL and the pixel position AFR is determined. The pixel position AFM is also the pixel position when the position of the right edge 214 of the image is assumed to be the 0th pixel. The pixel position AFM is the pixel position of the fold line.

Figure 16:
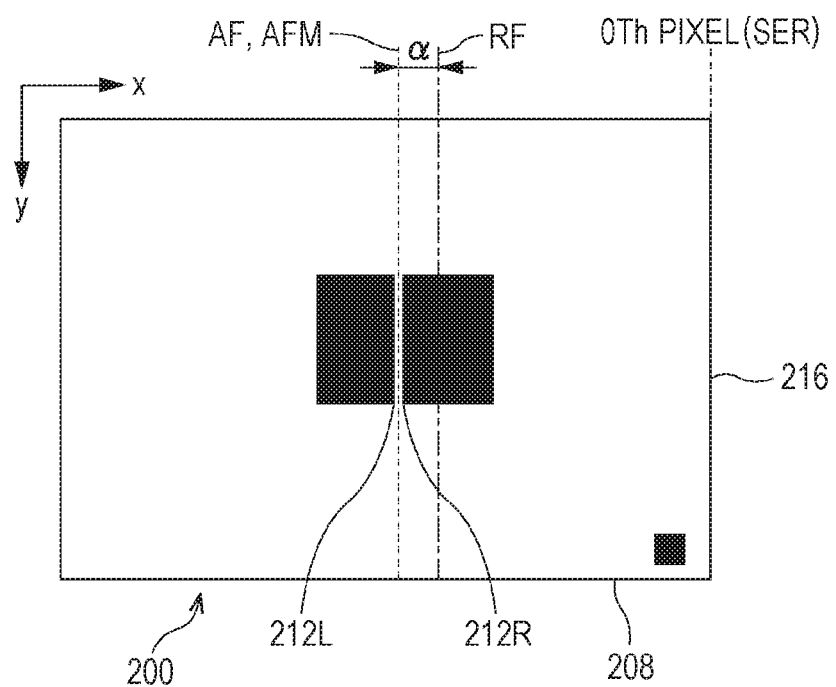
FIG. 16 is a view for explaining the difference between the position of a fold line and a reference fold position.

Next, the position of the pixel position AFM is calculated when the edge of the adjustment sheet section 202 (right edge 214 of the adjustment sheet section) on the side (right side), on which the reference edge mark image 208 is present, is defined as the 0th pixel in the x-axis direction. It is to be noted that hereinafter the right edge 216 of the adjustment sheet section is also referred to as a reference edge 216. In order to calculate this, first, a pixel position SER (pixel position in the x-axis direction) of the reference edge 216 when the right edge 214 of the image illustrated in FIG. 15 is defined as the 0th pixel is detected. The detection can be made by pattern matching, edge detection or the like in related art. The pixel position SER is then subtracted from the pixel position AFM, thus the pixel position AFM (pixel position AF) when the pixel position SER is defined as the 0th pixel can be calculated. FIG. 16 illustrates the pixel position AF. The pixel position AF is the identified position of the fold line.

Returning to FIG. 5, description of the flow of the adjustment processing is continued. In S112 subsequent to S110, the controller 68 obtains the difference between the position of the fold line and the reference position. The memory 70 stores the pixel position RF of the reference position with respect to the reference edge 216. FIG. 16 illustrates an example of the pixel position RF of the reference position. The controller 68 calculates the differential number α of pixels between the pixel position AF of the position of the fold line and the pixel position RF of the reference position. The product of the differential number α of pixels and a distance D1 (mm) per pixel corresponds to the displacement amount of the fold position.

Next, in S114 of FIG. 5, the controller 68 functions as the position adjusting unit 76, and sets an adjustment amount for the position of the fold line based on the differential number α of pixels between the pixel position AF of the position of the fold line and the pixel position RF of the reference position. The memory 70 pre-stores the distance D1 (mm) per pixel. As illustrated in FIG. 16, when the position AF of the identified fold line is on the left side of the reference fold position RF which is expected be the position of the fold line (when the differential number α of pixels is a positive value), an adjustment amount is set so that the position of the fold line is moved to the right side (closer to the reference edge 216) and matches the reference position RF. On the other hand, when the position AF of the identified fold line is on the right side of the reference fold position RF which is expected be the position of the fold line (when the differential number α of pixels is a negative value), an adjustment amount is set so that the position of the fold line is moved to the left side (away from the reference edge 216) and matches the reference position RF. The absolute value of the adjustment amount is the product of the differential number α of pixels and the distance D1 per pixel. The calculated adjustment amount is stored in the memory 70 in association with the type of paper and the fold pattern (set in FIGS. 6B and 6C). The adjustment amount is used when a user or the like issues an instruction for fold processing on the recording paper via the UI 72 or the PC in a normal time.

The above-described flow of FIG. 5 is performed for each type of paper and for each fold pattern, and an adjustment amount corresponding to the type and fold pattern is stored in the memory 70. When a user or the like issues an instruction for fold processing on the recording paper via the UI 72 or the PC, an adjustment amount corresponding to the set type of paper and fold pattern is read from the memory 70, and the fold position of the fold unit 18 is adjusted by the adjustment amount. In this manner, the controller 68 (the position adjusting unit 76) adjusts the fold position of the post processor 16 (the fold unit 18) based on the difference between the identified position of the fold line of the adjustment sheet and the reference position. It is to be noted that adjustment of the fold position is made, for instance, by adjusting the gate 62 which is the mechanism of the fold unit 18 illustrated in FIGS. 2A and 2B.

In the above-described fold position adjustment processing, a description has been given using an example of half fold in which fold is created at one position of the recording paper. However, needless to say, the inner triple fold or the Z fold may be made, in which fold is created at two or more positions in the recording paper. In this case, the adjustment pattern is printed for each of multiple fold positions of one adjustment sheet. For each of the positions of multiple fold lines of one adjustment sheet, the difference (the displacement amount) from the reference position is determined, and an adjustment amount for the fold position is obtained. That is, in the case of a folding pattern in which fold is created at two or more positions in the recording paper, adjustment amounts for multiple fold positions are obtained for one adjustment sheet.

<Crease Position Adjustment Processing>

Next, the crease position adjustment processing will be described. The crease position adjustment processing greatly differs from the fold position adjustment processing in that the position of a crease is adjusted by the post processor 16 (the crease former 19), and the image of the adjustment pattern is read with the adjustment sheet having a crease formed in the "landscape placement" on the platen PG. Since many points are common with the fold position adjustment processing, description duplicating with that of the fold position adjustment processing will be omitted as appropriate.

Figure 17:
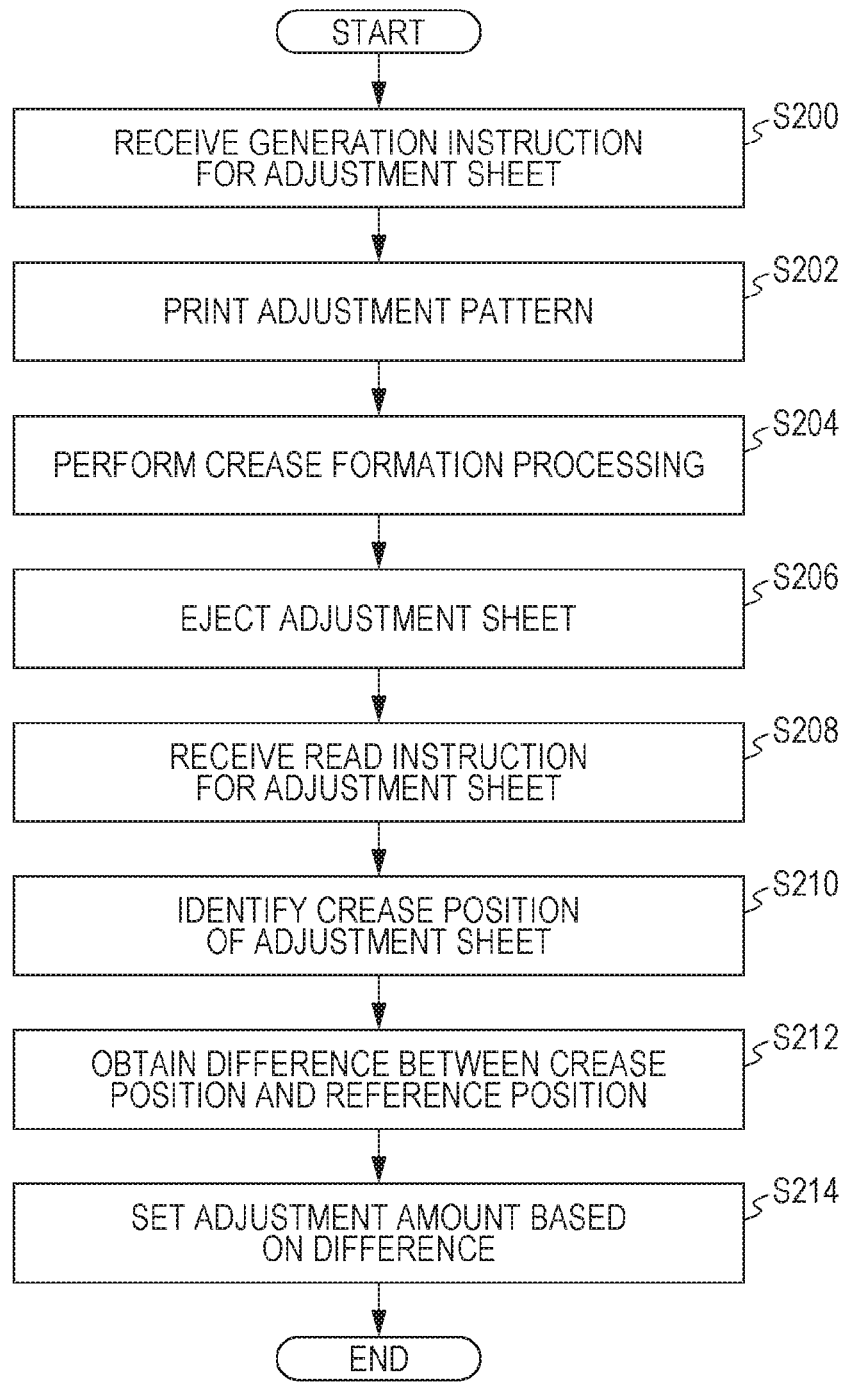
FIG. 17 is a flowchart illustrating the flow of the crease position adjustment processing of the image forming device.

FIG. 17 is a flowchart illustrating the flow of the crease position adjustment processing of the image forming device 10. In this exemplary embodiment, the crease position adjustment processing is performed by executing the flow of FIG. 17 for each of the types of recording paper.

First, in S200, the controller 68 receives a generation instruction for an adjustment sheet. This is the same as in the fold position adjustment processing. At this point, the screen displayed on the UI 72 is, for instance, FIGS. 6A to 6C similarly to the fold position adjustment processing.

Figure 18A:
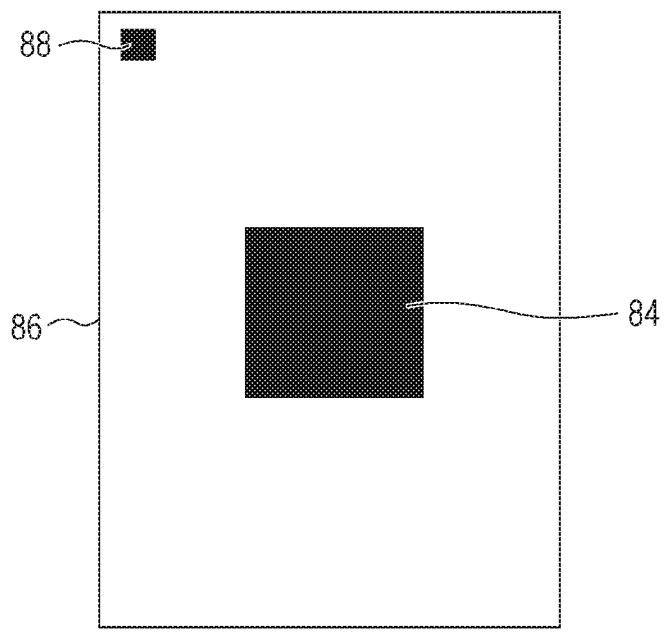
FIG. 18A is a view illustrating an example of an adjustment sheet on which an adjustment pattern in the crease position adjustment processing is printed.

Next, in S202, the controller 68 controls the image former 12 so that a predetermined adjustment pattern and a reference mark are printed on the recording paper (adjustment sheet) supplied from the paper tray 26 or the bypass tray 30. This is the same as in the fold position adjustment processing, but the print (formation) position of a reference mark on an adjustment sheet is different from that of the fold position adjustment processing. FIG. 18A is a view illustrating an example of an adjustment sheet 86 on which an adjustment pattern 84 in the crease position adjustment processing and a reference mark 88 are printed. As illustrated in FIG. 18A, the reference mark 88 is printed (formed) in an area in the upper left corner of the adjustment sheet 86. It is to be noted that the reference mark in the fold position adjustment processing is printed in an area in the upper right corner of the adjustment sheet (see FIG. 7A).

Figure 18B:
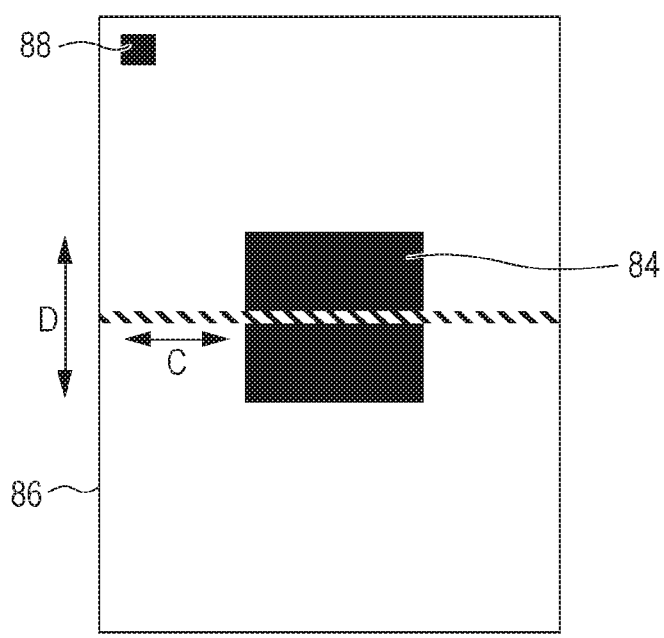
FIG. 18B is a view illustrating an example of a state of the adjustment sheet on which crease formation processing is performed.

In S202 of FIG. 17, after the adjustment pattern and the reference mark are printed on the adjustment sheet, the adjustment sheet is delivered to the post processor 16. In S204, the controller 68 controls the post processor 16 (the crease former 19) so that crease formation processing is performed on the adjustment sheet. FIG. 18B is a view illustrating an example of the adjustment sheet 86 in which a crease is formed. In FIG. 18B, the position at which a crease is formed is illustrated by oblique lines. Similarly to the fold position adjustment processing, the position of a crease of the adjustment sheet 86 is pre-stored as a reference position in the memory 70, for instance. In other words, the reference position is a predetermined crease position. Although the crease former 19 performs crease formation processing on the adjustment sheet 86 in accordance with the reference position, an actual position, at which a crease is formed, may deviate from the reference position. Here, the crease former 19 forms a crease across the adjustment pattern 84.

Next, in S206 of FIG. 17, the controller 68 discharges the adjustment sheet with a crease formed by the crease former 19 to the discharge tray 58. A user or the like then places the adjustment sheet (the adjustment sheet with a crease formed) discharged to the discharge tray 58 on the platen PG of the image reader 14.

Figure 19:
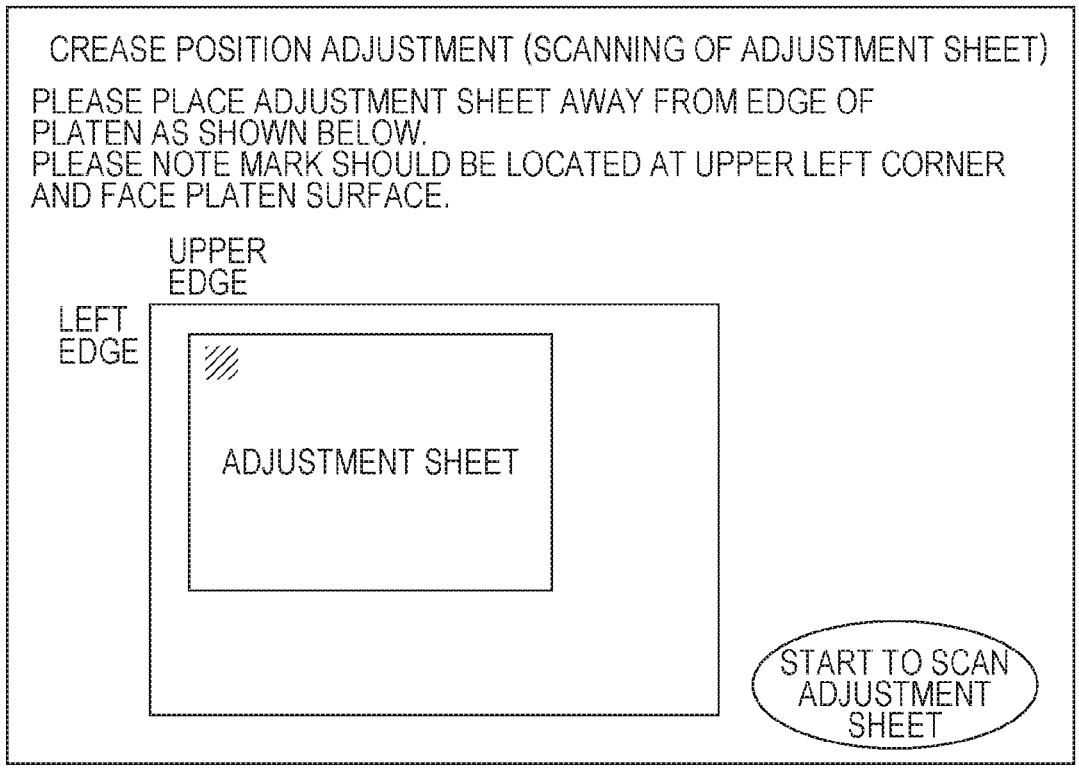
FIG. 19 illustrates an example of a guide screen when an adjustment sheet in the crease position adjustment processing is placed on the platen.
Figure 20:
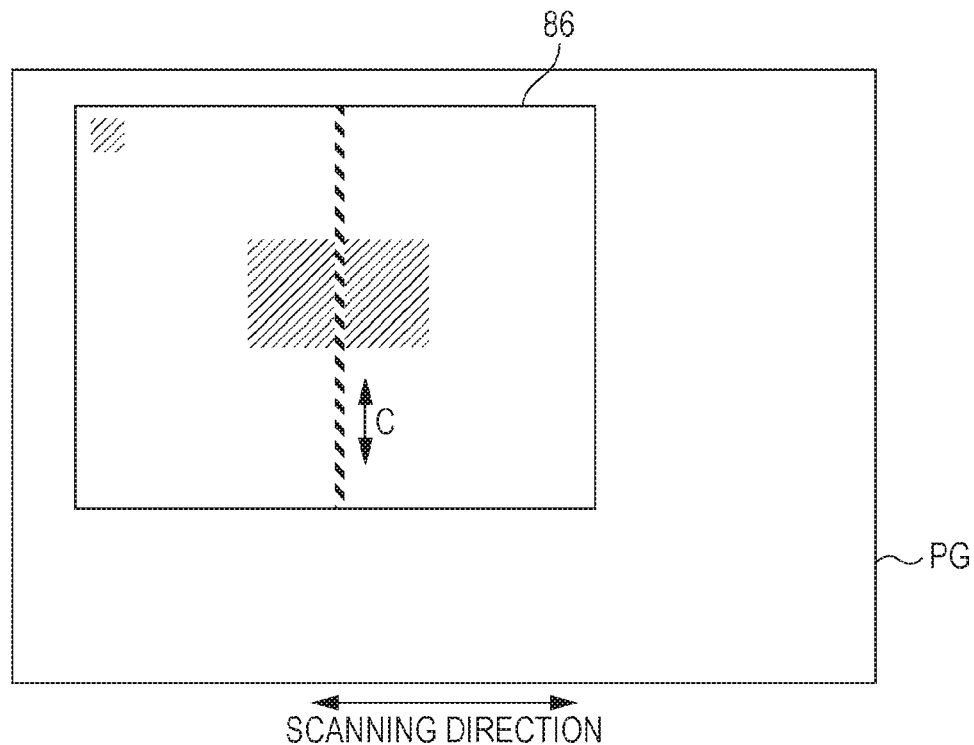
FIG. 20 is a view illustrating a state where an adjustment sheet is placed on the platen in the crease position adjustment processing.

FIG. 19 is an example of a guide screen (a second screen) for placing an adjustment sheet displayed on the UI 72, on the platen. Although the guide screen (the second screen) is the same as that of the fold position adjustment processing, the placement orientation of the adjustment sheet on the platen PG is different from that of the guide screen (the first screen, see FIG. 8) for the fold position adjustment processing. FIG. 20 is a top view of a state where the adjustment sheet 86 with a crease formed is placed on the platen PG. Since the adjustment sheet 86 is placed such that the side thereof, on which the reference mark and the adjustment pattern are printed, faces the platen PG in FIG. 20, the reference mark and the adjustment pattern are not seen. However, in order to clarify those positions, the positions are illustrated by thin lines. FIG. 20 also illustrates the scanning direction of the exposure optical system 50 (scanner) of the image reader 14. As illustrated in FIG. 20, unlike the fold position adjustment processing, in the crease position adjustment processing, the adjustment sheet 86 (the second adjustment sheet) is placed on the platen PG so that the image of the adjustment sheet 86 is read by scanning the adjustment sheet 86 with the scanner of the image reader 14 in a direction (crossing direction) which crosses the direction C along the crease (thick oblique lines of FIG. 21). In short, "landscape placement" is applied to the adjustment sheet 86 on the platen PG. Here, an adjustment sheet in the "landscape placement" is defined as a second adjustment sheet.

As illustrated in FIGS. 19 and 20, the adjustment sheet is placed on the platen PG so that the reference mark is located at the upper left corner which is in a predetermined direction. This is the same as in the fold position adjustment processing (see FIGS. 8, 9). Specifically, although "portrait placement" is applied to the adjustment sheet in the fold position adjustment processing, and "landscape placement" is applied to the adjustment sheet in the crease position adjustment processing, respective reference marks are located in a predetermined direction (the upper left corner in this exemplary embodiment). In short, a user or the like only has to place the adjustment sheet without paying attention to "portrait placement" and "landscape placement" of the adjustment sheet so that the reference mark is located in a predetermined direction. Consequently, a user or the like is not confused about the placement orientation of the adjustment sheet, and the adjustment sheet is accurately placed.

Next, in S208 of FIG. 17, the controller 68 receives a read instruction for adjustment sheet via the UI 72. Specifically, when the "START TO SCAN ADJUSTMENT SHEET" button illustrated in FIG. 19 is touched, a read instruction for adjustment sheet is received. The controller 68 then controls the image reader 14 so that the image (the image of the second adjustment sheet) of the adjustment sheet is read.

Figure 21:
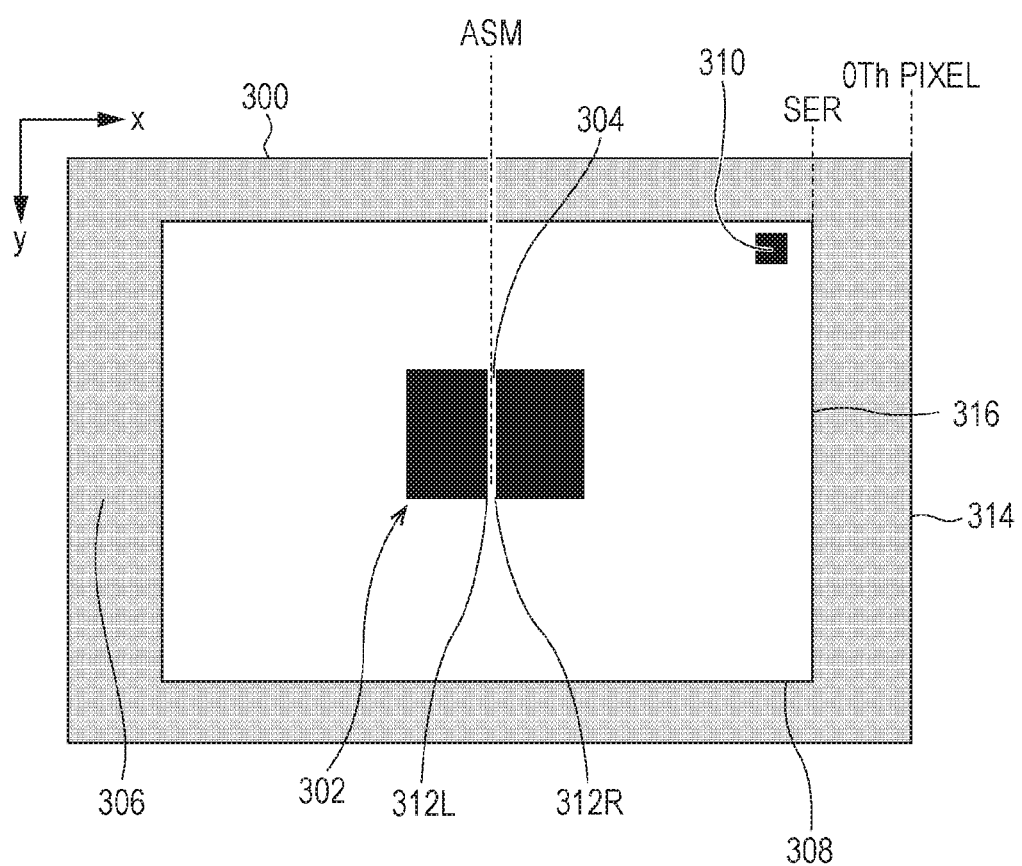
FIG. 21 is a view illustrating an example of an image of an adjustment sheet, which is read in the crease position adjustment processing.

FIG. 21 is a view illustrating an example of an image of a read adjustment sheet. As illustrated in FIG. 21, similarly to the fold position adjustment processing, the image 300 of the adjustment sheet has an adjustment sheet section 308 (white section of FIG. 21), and an outer-side section 306 (gray section of FIG. 21) of the adjustment sheet section 308. An adjustment pattern section 302, and an image of a reference mark (a reference mark image 310) appear on the adjustment sheet section 308. Also, similarly to the fold position adjustment processing, a white section 304, which is an area having a crease, appears in the adjustment pattern section 302. The controller 68 identifies the position of a crease in the adjustment sheet by identifying a predetermined position of the white section 304.

In the crease position adjustment processing, the image of the adjustment pattern is read with the adjustment sheet in the "landscape placement" on the platen PG, and the white section 304 distinctly appears in the adjustment pattern section 302.

As illustrated in FIG. 14, unlike a folded adjustment sheet, in the adjustment sheet having a crease formed, toner is not separated from the portion of the crease. Even if toner is separated, the amount of separated toner is extremely little. Thus, it is not possible to cause the white section 304 to appear in the adjustment pattern section 302 due to the factor of separation of toner. Meanwhile, as described with reference to FIGS. 13A and 13B, when "landscape placement" is applied to the adjustment sheet (recording paper) on the platen PG, the angle of specular reflection light changes at a portion where the adjustment sheet floats from the platen PG, and the specular reflection light is inputted into the CCD 56. Thus, it is possible to cause the white section 304 to appear in the adjustment pattern section 302 due to the factor of the specular reflection light. In particular, unlike a folded adjustment sheet, when the adjustment sheet with a crease formed is placed on the platen PG, float from the platen PG (float at a crease) is small, and thus the white section 304 does not appear blurred. Thus, in this exemplary embodiment, "landscape placement" is applied to the adjustment sheet 86 on the platen PG. Consequently, the white section 304 distinctly appears in the adjustment pattern section 302.

Returning to FIG. 17, in S210, the controller 68 functions as the position specifying unit 74, and identifies the position of a crease based on the crease which appears in the image of the adjustment sheet. An identification method for the position of a crease is the same as the identification method for the position of a fold line.

Specifically, the position of a crease is identified in the following manner. As illustrated in FIG. 21, the adjustment pattern section 302 includes change portions 312L, 312R in which change is made in the X-axis direction from black color (or a highly concentrated color) to the white section 304 which is the area of a crease. First, the pixel positions of the change portions 312L, 312R in the x-axis direction of FIG. 21 are detected. The pixel positions are detected relative to the edge of the image (right edge 314 of the image) on the right side as the 0th pixel, the right side including the reference mark image 310. A pixel position ASM in the middle (the center) of these pixel positions is determined. The pixel position ASM is also the pixel position when the position of the right edge 314 of the image is assumed to be the 0th pixel. The pixel position ASM is the pixel position of the crease.

Figure 22:
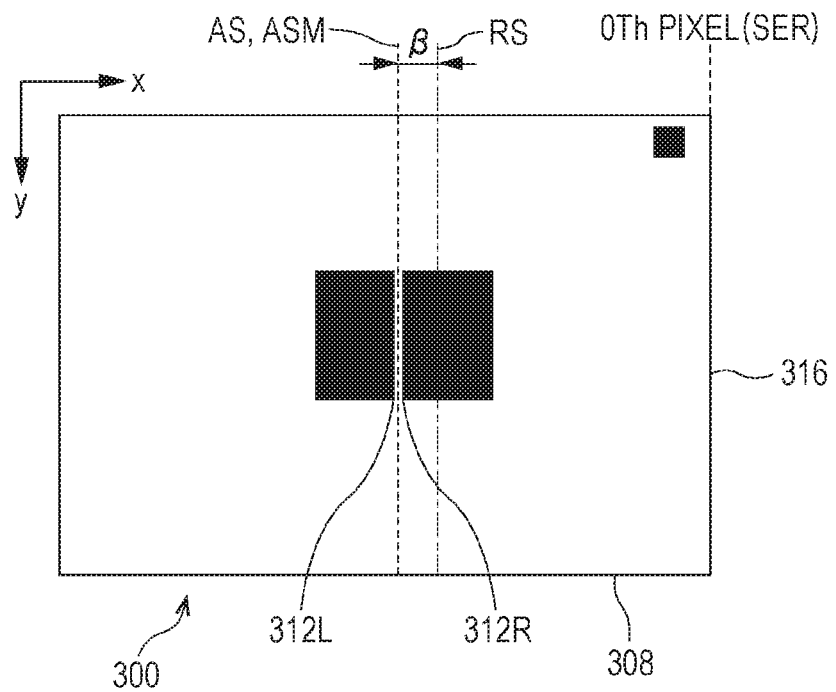
FIG. 22 is a view for explaining the difference between a crease position and a reference fold position.

The position of the pixel position ASM is calculated when the edge of the adjustment sheet section 308 (a right edge 316 of the adjustment sheet section) on the side (the right side) including the reference mark image 310 is assumed to be the 0th pixel in the x-axis direction. FIG. 22 illustrates the pixel position AS. The pixel position AS is the position of the identified crease. It is to be noted that hereinafter the right edge 316 of the adjustment sheet section is also referred to as the reference edge 316.

Figure 23:
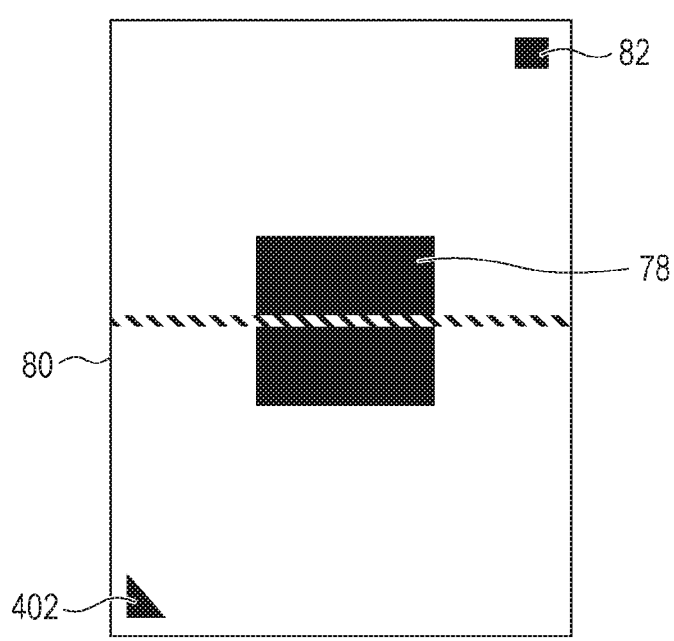
FIG. 23 is a view illustrating an example of an adjustment sheet (first adjustment sheet) in the "portrait placement" when an image of the adjustment sheet is read twice separately.

Returning to FIG. 17, description of the flow of the adjustment processing is continued. In S212 subsequent to S210, the controller 68 obtains the difference between the position of the crease and the reference position. The memory 70 stores a pixel position RS of the reference position with respect to the reference edge 316. FIG. 23 illustrates an example of the pixel position RS of the reference position. The controller 68 calculates the differential number β of pixels between the pixel position AS of the position of the crease and the pixel position RS of the reference position. The product of the differential number β of pixels and a distance D2 (mm) per pixel corresponds to the displacement amount of the crease position.

Next, in S214 of FIG. 17, the controller 68 functions as the position adjusting unit 76, and sets an adjustment amount for the position of the crease based on the differential number β of pixels between the pixel position AS of the position of the crease and the pixel position RF of the reference position. This is the same as in the fold position adjustment processing. The adjustment amount is stored in the memory 70 in association with the type of paper (set in FIG. 6C). The adjustment amount is used when a user or the like issues an instruction for crease formation processing on the recording paper via the UI 72 or the PC in a normal time.

The above-described flow of FIG. 17 is performed for each type of paper, and an adjustment amount corresponding to the type is stored in the memory 70. When a user or the like issues an instruction for crease formation processing on the recording paper via the UI 72 or the PC, an adjustment amount corresponding to the set type of paper is read from the memory 70, and the crease position of the crease former 19 is adjusted by the adjustment amount. In this manner, the controller 68 (the position adjusting unit 76) adjusts the crease position of the post processor 16 (the crease former 19) based on the difference between the position of the identified crease of the adjustment sheet and the reference position.

In the above-described crease position adjustment processing, a crease is created in the recording paper. However, needless to say, two or more creases may be made in the recording paper. In this case, an adjustment pattern is printed at each of the positions at which multiple creases are formed in one adjustment sheet. For each of multiple crease positions of one adjustment sheet, the difference (displacement amount) between the crease position and the reference position is determined, and an adjustment amount for the crease position is obtained. In other words, when two or more creases are made in the recording paper, adjustment amounts for multiple crease positions are obtained by one adjustment sheet.

<Operational Effect>

In the fold position adjustment processing described above, the image of the adjustment sheet is read using the adjustment sheet (the first adjustment sheet) in "portrait placement" on the platen PG, and a fold line thereby clearly (distinctly) appears in the image of the adjustment sheet, and the position of the fold line is accurately identified, and the fold position adjustment can be performed with high accuracy. Also, in the crease position adjustment processing described above, the image of the adjustment sheet is read using the adjustment sheet (the second adjustment sheet) in "landscape placement" on the platen PG, and a crease thereby clearly (distinctly) appears in the image of the adjustment sheet, and the position of the crease is accurately identified, and the crease position adjustment can be performed with high accuracy. That is, the orientation of the adjustment sheet to be placed on the platen PG is changed according to the post processing (the fold processing, the crease formation processing), and thus a fold position or a crease position can be appropriately identified.

Also, a user or the like may be confused about the placement orientation of the adjustment sheet, when "portrait placement" or "landscape placement" is applied to the adjustment sheet like this, however, in this exemplary embodiment, such confusion is avoided. Specifically, the reference marks 82, 88 are formed in the adjustment sheets 80, 86, respectively so that the position of the reference mark 82 (the first reference mark) on the first adjustment sheet 80 and the position of the reference mark 88 (the second reference mark) on the second adjustment sheet 86 have a symmetrical positional relationship with respect to the direction along a fold or a crease (see FIG. 7B and FIG. 18B). Thus, even when either adjustment sheet is placed on the platen PG, the reference marks 82, 88 only have to be located in a predetermined direction (the upper left corner in the exemplary embodiment), and a user or the like does not need to pay attention to "portrait placement" and "landscape placement" of the adjustment sheet. Consequently, a user or the like is not confused about the placement orientation of the adjustment sheet. In other words, when a user or the like places an adjustment sheet on the platen PG, the orientation of the adjustment sheet placed is clear. Therefore, the adjustment sheet is accurately placed on the platen PG.

Another Exemplary Embodiment

In the exemplary embodiment described above, "portrait placement" is applied to the adjustment sheet on the platen PG for the fold position adjustment, and "landscape placement" is applied to the adjustment sheet on the platen PG for the crease position adjustment. However, the orientation of the adjustment sheet placed on the platen PG may be changed according to the paper characteristics of the recording paper (adjustment sheet) to be adjusted, for instance. In other words, the orientation of the adjustment sheet placed on the platen PG may be changed according to the paper type of the adjustment sheet. For instance, when the adjustment sheet is thin paper in the fold position adjustment, float of a folded adjustment sheet placed on the platen PG is small at a fold line, as compared when the adjustment sheet is thick paper, and a white section (fold line) may distinctly appear on the image of the adjustment sheet even for "landscape placement". Thus, even for the fold position adjustment, when the adjustment sheet is thin paper, "landscape placement" may be applied to the adjustment sheet. Thus, for a paper type in which float at a fold line on the platen PG is small, "landscape placement" may be applied to the adjustment sheet.

In the exemplary embodiments described above, the reference mark is printed on the surface of the adjustment sheet, on which an adjustment pattern is printed. However, the reference mark may be printed on the surface opposite to the surface of the adjustment sheet, on which an adjustment pattern is printed. Consequently, when the adjustment sheet is placed so that the surface on which an adjustment pattern is printed faces the platen PG surface, the reference mark is visible by a user or the like. Therefore, it is possible to prevent a user or the like from placing the adjustment sheet in a wrong orientation.

Figure 24A:
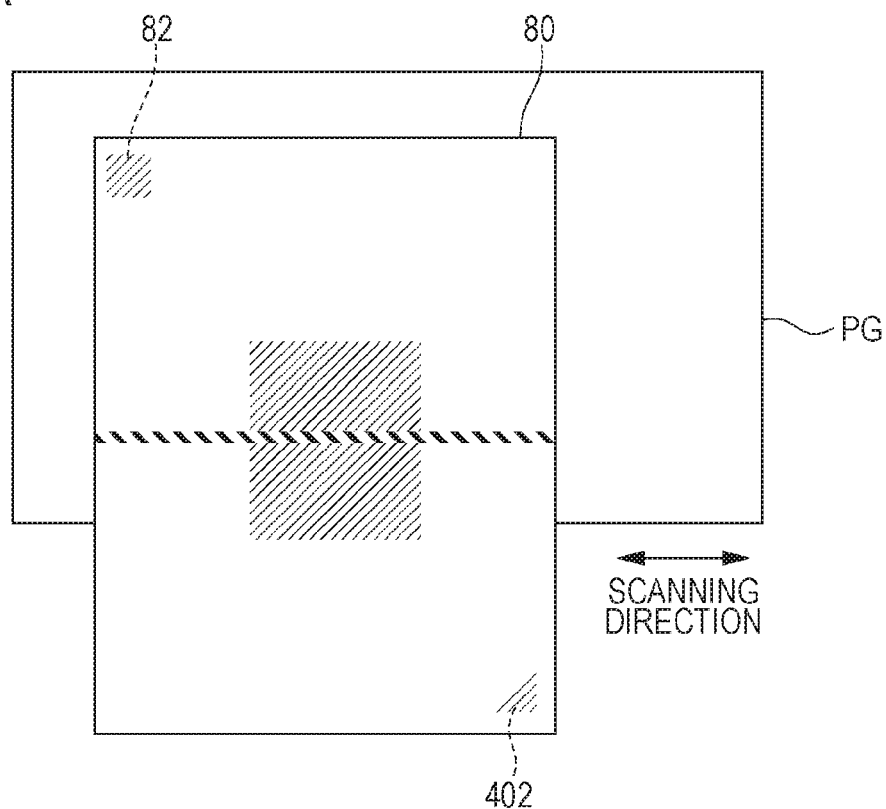
FIGS. 24A and 24B are each a view illustrating the manner in which the adjustment sheet of FIG. 23 is placed on the platen PG when an image of the adjustment sheet is read twice separately.
Figure 26A:
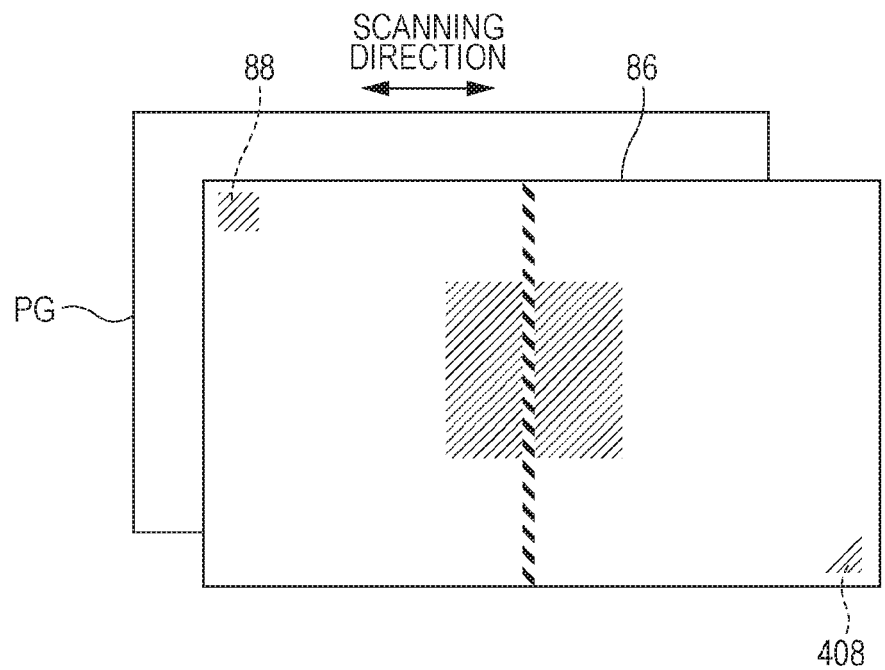
FIGS. 26A and 26B are each a view illustrating the manner in which the adjustment sheet of FIG. 25 is placed on the platen PG when an image of the adjustment sheet is read twice separately.

Next, the case where the image of the adjustment sheet is read twice separately by the image reader 14 will be described. As illustrated in FIG. 24A, when the lengthwise width of the adjustment sheet (the first adjustment sheet) in "portrait placement" is larger than the width (the lengthwise width) of the placement surface of the platen PG, the image of the adjustment sheet may be desired to be read twice separately. It is to be noted that in other words, the lengthwise width of the adjustment sheet in "portrait placement" is the width of the adjustment sheet in a direction (crossing direction) which crosses the direction along a fold line or a crease. Similarly, as illustrated in FIG. 26A, when the crosswise width of the adjustment sheet (the second adjustment sheet) in "landscape placement" is larger than the width (the crosswise width) of the platen PG, the image of the adjustment sheet may be desired to be read twice separately. It is to be noted that in other words, the crosswise width of the adjustment sheet in "landscape placement" is the width of the adjustment sheet in a direction (crossing direction) which crosses the direction along a fold line or a crease. Hereinafter simply called "width of the adjustment sheet" indicates the width of the adjustment sheet in the crossing direction.

The reason why the image is desired to be read twice separately is, for example, as follows. When the image of the adjustment sheet is read by the image reader 14, a magnification error may occur, and the image of the adjustment sheet may be read with a length different from the actual width of the adjustment sheet. In this case, even when the pixel position RF (see FIG. 16) of a reference position with respect to the reference edge 216 of the adjustment sheet section in the image 200 of the adjustment sheet is pre-stored in the memory 70, the pixel position RF may be an erroneous value. Thus, when the adjustment sheet "half folded", the adjustment sheet is first folded in the middle as the reference position, and the image of the adjustment sheet is read by the image reader 14. Here, it is assumed that the width of the adjustment sheet is smaller than the width of the platen PG, and the entire image of the adjustment sheet is read at a time. The width of the adjustment sheet (the width of the adjustment sheet section) is then recognized in the image of the adjustment sheet, and the pixel position in the middle of the width of the adjustment sheet section is defined as the pixel position RF of the reference position. Thus, even when a magnification error occurs and the width of the adjustment sheet section is changed, the pixel position RF of the reference position provides an accurate position, and the fold position adjustment can be performed accurately. The same goes with the crease position adjustment. However, when the width of the adjustment sheet is larger than the width of the platen PG, the width of the adjustment sheet (the width of the adjustment sheet section) cannot be recognized, and this is unfeasible. Thus, when the width of the adjustment sheet is larger than the width of the platen PG, the image of the adjustment sheet is read twice separately, and the width of the adjustment sheet (the width of the adjustment sheet section) is thereby recognized by combining read images. Consequently, even when the width of the adjustment sheet is larger than the width of the platen PG, the above-described fold position adjustment, and crease position adjustment can be performed.

Figure 24B:
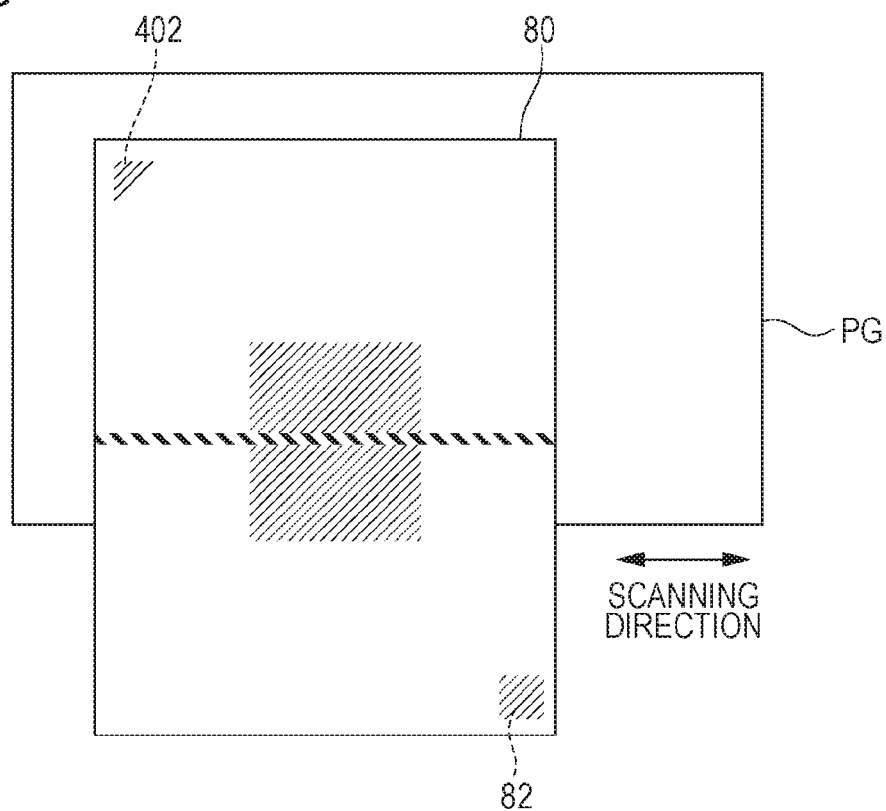

FIG. 23 is a view illustrating an example of the adjustment sheet (the first adjustment sheet) in the "portrait placement" when the image of the adjustment sheet is read twice separately. As illustrated in FIG. 23, in the first adjustment sheet 80, a reference mark 402 (a third reference mark) is printed (formed) at a symmetrical position of the position of the reference mark 82 (the first reference mark) with respect to the paper center. FIGS. 24A and 24B are each a view illustrating the manner in which the first adjustment sheet of FIG. 23 is placed on the platen PG when the image of the adjustment sheet (the image of the first adjustment sheet) is read twice separately. It is to be noted that since the adjustment sheet 80 is placed such that the side thereof, on which the reference marks 82, 402 and the adjustment pattern are printed, faces the platen PG in FIGS. 24A and 24B, the reference marks 82, 402 and the adjustment pattern are not seen. However, in order to clarify those positions, the positions are illustrated by thin lines. The same goes with FIGS. 26A and 26B described below. FIG. 24A illustrates the manner in which the first adjustment sheet 80 is placed on the platen PG when the image of the adjustment sheet is read for the first time. FIG. 24B illustrates the manner in which the first adjustment sheet 80 is placed on the platen PG when the image of the adjustment sheet is read for the second time. As illustrated in FIG. 24A, the first adjustment sheet 80 is placed for the first reading so that the first reference mark 82 is located in the upper left corner which is in a predetermined direction. As illustrated in FIG. 24B, the first adjustment sheet 80 is placed for the second reading so that the third reference mark 402 is located in the upper left corner which is in a predetermined direction. Even when the image of the adjustment sheet is read twice separately in this manner, the adjustment sheet only has to be placed so that the reference marks (the first reference mark 82 and the third reference mark 402) are located in a predetermined direction. Thus, a user or the like can easily recognize the orientation of the adjustment sheet to be placed.

Figure 25:
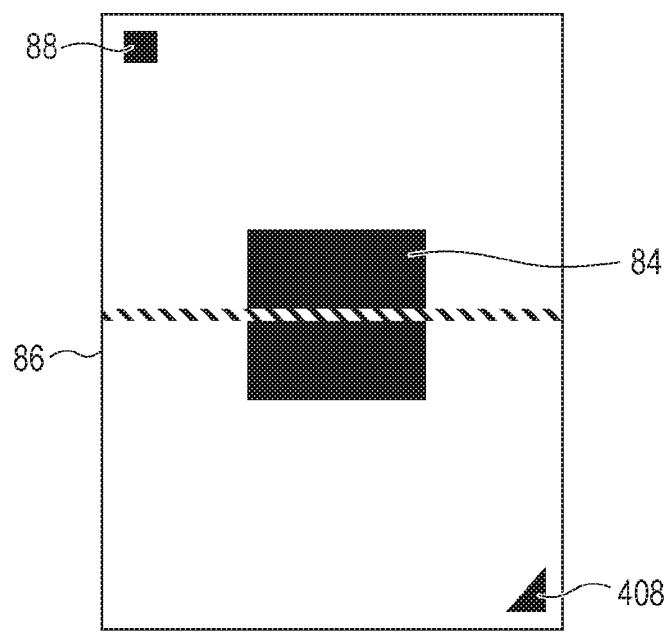
FIG. 25 is a view illustrating an example of an adjustment sheet (second adjustment sheet) in the "landscape placement" when an image of the adjustment sheet is read twice separately.
Figure 26B:
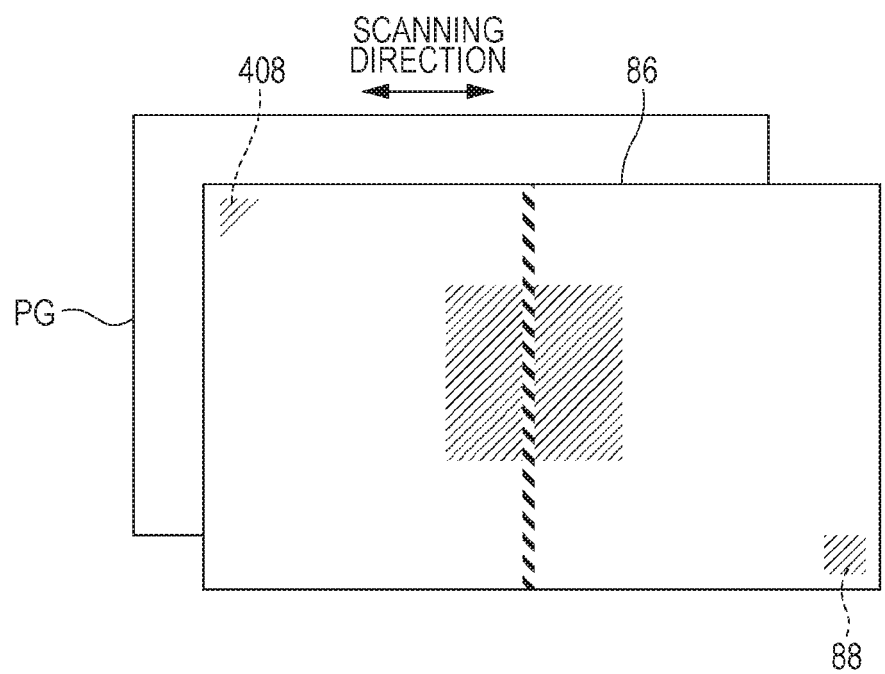

FIG. 25 is a view illustrating an example of the adjustment sheet (the second adjustment sheet) in "landscape placement" when the image of the adjustment sheet is read twice separately. As illustrated in FIG. 25, in the second adjustment sheet 86, a reference mark 408 (a fourth reference mark) is printed (formed) at a symmetrical position of the position of the reference mark 88 (the second reference mark) with respect to the paper center. FIGS. 26A and 26B are each a view illustrating the manner in which the adjustment sheet of FIG. 25 is placed on the platen PG when the image of the adjustment sheet (the image of the second adjustment sheet) is read twice separately. FIG. 26A illustrates the manner in which the second adjustment sheet 86 is placed on the platen PG when the image of the adjustment sheet is read for the first time. FIG. 26B illustrates the manner in which the second adjustment sheet 86 is placed on the platen PG when the image of the adjustment sheet is read for the second time. As illustrated in FIG. 26A, the second adjustment sheet 86 is placed for the first reading so that the second reference mark 88 is located in the upper left corner which is in a predetermined direction. As illustrated in FIG. 24B, the second adjustment sheet 86 is placed for the second reading so that the fourth reference mark 408 is located in the upper left corner which is in a predetermined direction. In this manner, also for the adjustment sheet (the second adjustment sheet) in "landscape placement", similarly to the adjustment sheet (the first adjustment sheet) in "portrait placement" described above, the adjustment sheet only has to be placed so that the reference marks (the second reference mark 88 and the fourth reference mark 408) are always located in a predetermined direction. Thus, a user or the like can easily recognize the orientation of the adjustment sheet to be placed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device comprising:
   a post processor configured to perform post processing to execute folding or form a crease on an adjustment sheet in which a reference mark and an adjustment pattern filled in with black or a highly concentrated color are formed, across the adjustment pattern using a predetermined reference position;
   an image reader configured to read an image of the adjustment sheet if an orientation of the adjustment sheet placed on a platen is changed according to a type of the post processing or paper characteristics of the adjustment sheet, and the adjustment sheet, on which the post processing has been performed, is placed on the platen so that the reference mark is located in a predetermined direction on the platen;
   at least one processor configured to execute:
      a position identifying unit that identifies a position of a fold line or a crease using the fold line or the crease that appears in the image of the adjustment sheet; and
      a position adjusting unit that adjusts a fold position or a position of a crease of the post processor using a difference between a position of the fold line or the crease and the reference position.

2. The image forming device according to claim 1,
   wherein the adjustment sheet includes a first adjustment sheet and a second adjustment sheet, the first adjustment sheet being placed on the platen so that the image of the adjustment sheet is scanned and read in a direction along a fold or a crease, the second adjustment sheet being placed on the platen so that the image of the adjustment sheet is scanned and read in a crossing direction which crosses the direction along the fold or the crease, and
   wherein a position of a first reference mark on the first adjustment sheet and a position of a second reference mark on the second adjustment sheet have a symmetrical positional relationship with respect to the direction along the fold or the crease.

3. The image forming device according to claim 2,
   wherein if the position of the fold line is identified by the position identifying unit, the first adjustment sheet is used, and
   wherein the position of the crease is identified by the position identifying unit, the second adjustment sheet is used.

4. The image forming device according to claim 2,
   wherein the first reference mark is formed in an area of a corner of the first adjustment sheet, and
   wherein the second reference mark is formed in an area of a corner of the second adjustment sheet.

5. The image forming device according to claim 3,
   wherein the first reference mark is formed in an area of a corner of the first adjustment sheet, and
   wherein the second reference mark is formed in an area of a corner of the second adjustment sheet.

6. The image forming device according to claim 2, further comprising:
   a display configured to display a first screen indicating an orientation of the first adjustment sheet to be placed on the platen, and a second screen indicating an orientation of the second adjustment sheet to be placed on the platen.

7. The image forming device according to claim 3, further comprising:
   a display configured to display a first screen indicating an orientation of the first adjustment sheet to be placed on the platen, and a second screen indicating an orientation of the second adjustment sheet to be placed on the platen.

8. The image forming device according to claim 4, further comprising:
   a display configured to display a first screen indicating an orientation of the first adjustment sheet to be placed on the platen, and a second screen indicating an orientation of the second adjustment sheet to be placed on the platen.

9. The image forming device according to claim 5, further comprising:
   a display configured to display a first screen indicating an orientation of the first adjustment sheet to be placed on the platen, and a second screen indicating an orientation of the second adjustment sheet to be placed on the platen.

10. The image forming device according to claim 2,
    wherein in the first adjustment sheet, a third reference mark is formed at a symmetrical position of the position of the first reference mark with respect to a paper center, and
    wherein the image forming device is configured such that, if a width of the first adjustment sheet in a crossing direction, which is a direction crossing the direction along the fold or the crease, is larger than a width of the platen, an image of the first adjustment sheet is read twice separately by the image reader, and
    wherein the first adjustment sheet is unfolded and placed on the platen so that, if the image of the first adjustment sheet is read for a second time, the third reference mark is located in the predetermined direction on the platen.

11. The image forming device according to claim 2,
wherein in the second adjustment sheet, a fourth reference mark is formed at a symmetrical position of the position of the second reference mark with respect to a paper center,
wherein the image forming device is configured such that, if a width of the second adjustment sheet in a crossing direction, which is a direction crossing the direction along the fold or the crease, is larger than a width of the platen, an image of the second adjustment sheet is read twice separately by the image reader, and
wherein the second adjustment sheet is unfolded and placed on the platen so that if the image of the second adjustment sheet is read for a second time, the fourth reference mark is located in the predetermined direction on the platen.

12. An image forming device comprising:
an image former configured to form in advance a reference mark indicating an orientation of a sheet to be placed on a platen, and an adjustment pattern filled in with black or a highly concentrated color in an area folded by or an area in which a crease is formed by a post processor,
wherein the sheet is configured for identifying a position of a fold line or a crease of the post processor that performs post processing to execute folding or form a crease on paper,
wherein the orientation of the sheet to be placed on the platen is changed according to the post processing or paper characteristics of the sheet, and
wherein the position of a fold line or a crease is identified by reading an image of the sheet with the sheet unfolded and placed on the platen.

13. A method comprising:
performing post processing to execute folding or form a crease on an adjustment sheet in which a reference mark and an adjustment pattern filled in with black or a highly concentrated color are formed, across the adjustment pattern using a predetermined reference position;
reading an image of the adjustment sheet if an orientation of the adjustment sheet placed on a platen is changed according to a type of the post processing or paper characteristics of the adjustment sheet, and the adjustment sheet, on which the post processing has been performed, is placed on the platen so that the reference mark is located in a predetermined direction on the platen;
identifying a position of a fold line or a crease using the fold line or the crease that appears in the image of the adjustment sheet; and
adjusting a fold position or a position of a crease of the post processor using a difference between a position of the fold line or the crease and the reference position.

* * * * *